(12) United States Patent
Murayama et al.

(10) Patent No.: US 11,390,125 B2
(45) Date of Patent: Jul. 19, 2022

(54) WHEEL REGISTRATION APPARATUS AND TIRE PRESSURE MONITORING SYSTEM INCLUDING THE SAME

(71) Applicant: DENSO CORPORATION, Kariya (JP)

(72) Inventors: Koji Murayama, Kariya (JP); Masashi Urabe, Kariya (JP); Masahiro Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 17/071,142

(22) Filed: Oct. 15, 2020

(65) Prior Publication Data
US 2021/0023892 A1 Jan. 28, 2021

Related U.S. Application Data

(63) Continuation of application No. PCT/JP2018/044364, filed on Dec. 3, 2018.

(30) Foreign Application Priority Data

Apr. 20, 2018 (JP) .............................. JP2018-081485
Nov. 21, 2018 (JP) .............................. JP2018-218619

(51) Int. Cl.
*B60C 23/04* (2006.01)

(52) U.S. Cl.
CPC ...... *B60C 23/0445* (2013.01); *B60C 23/0415* (2013.01); *B60C 23/0438* (2013.01)

(58) Field of Classification Search
CPC ............ B60C 23/0445; B60C 23/0415; B60C 23/0438; B60C 23/0416; B60C 19/00; B60C 23/0489; B60C 23/04; G01L 17/00

USPC ................................................. 340/442, 447
See application file for complete search history.

(56) References Cited

U.S. PATENT DOCUMENTS

| | | | | |
|---|---|---|---|---|
| 7,262,688 B2* | 8/2007 | Ogawa | ............... | B60C 23/0415 340/447 |
| 7,705,714 B2* | 4/2010 | Mori | ................... | B60C 23/0416 340/447 |
| 9,186,938 B2* | 11/2015 | Okada | ................. | B60C 23/0488 |
| 9,434,217 B2* | 9/2016 | Mori | ................... | B60C 23/0416 |
| 10,882,366 B2* | 1/2021 | Kuchler | ............. | B60C 23/0464 |
| 2005/0033485 A1* | 2/2005 | Nimmo | ............... | B60C 23/0416 701/1 |

(Continued)

FOREIGN PATENT DOCUMENTS

| | | |
|---|---|---|
| DE | 19921178 A1 | 5/1999 |
| JP | 2010274749 A | 12/2010 |
| JP | 2016-137844 A | 8/2016 |

*Primary Examiner* — Eric Blount
(74) *Attorney, Agent, or Firm* — Harness, Dickey & Pierce, P.L.C.

(57) ABSTRACT

A wheel registration apparatus applied to a vehicle comprises: a transmitter that is provided on each of the four traveling wheels provided with tires and has a first controller configured to create and transmit a frame including unique identification information; and a receiver that is provided on a vehicle body, receives the frames transmitted by the transmitters provided on the four traveling wheels via a reception antenna in a registration mode, and has a second controller configured to register four pieces of the identification information included in the respective frames as pieces of identification information of the transmitters provided on current four traveling wheels.

16 Claims, 21 Drawing Sheets

(56) References Cited

U.S. PATENT DOCUMENTS

| | | | |
|---|---|---|---|
| 2009/0273461 A1* | 11/2009 | Buck | B60C 23/0416 340/447 |
| 2010/0300192 A1* | 12/2010 | Isomura | B60C 23/0488 73/146.3 |
| 2010/0302063 A1* | 12/2010 | Isomura | B60C 23/0408 340/870.16 |
| 2015/0183279 A1* | 7/2015 | Okada | B60C 23/0416 235/375 |
| 2017/0210185 A1* | 7/2017 | Sekizawa | G01D 5/16 |
| 2018/0134102 A1* | 5/2018 | Okada | G01P 15/00 |
| 2021/0122197 A1* | 4/2021 | Sekizawa | G01P 15/00 |

* cited by examiner

FIRST RECEPTION

SECOND RECEPTION

THIRD RECEPTION

| RECEPTION | TIME (t) | TEETH POSITION AT RECEPTION (0–95) | | | | WHEEL POSITION SPECIFICATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 68 | 92 | 62 | 78 | – | – | – | – |
| RECEPTION 2 | 5.1 | 56 | 42 | 38 | 8 | TRUE | FALSE | TRUE | FALSE |
| RECEPTION 3 | 10.3 | 72 | 26 | 42 | 72 | TRUE | | TRUE | |
| RECEPTION 4 | 14.3 | 60 | 62 | 22 | 6 | TRUE | | FALSE | |

| RECEPTION | TIME (t) | TEETH POSITION AT RECEPTION (0–95) | | | | WHEEL POSITION SPECIFICATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 38 | 68 | 30 | 50 | – | – | – | – |
| RECEPTION 2 | 4.1 | 2 | 78 | 80 | 46 | FALSE | TRUE | FALSE | TRUE |
| RECEPTION 3 | 8.3 | 42 | 74 | 14 | 28 | | TRUE | | TRUE |
| RECEPTION 4 | 12.4 | 88 | 78 | 52 | 22 | | TRUE | | FALSE |

| RECEPTION | TIME (t) | TEETH POSITION AT RECEPTION (0-95) | | | | WHEEL POSITION SPECIFICATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 62 | 94 | 54 | 76 | — | — | — | — |
| RECEPTION 2 | 4.5 | 80 | 66 | 60 | 32 | TRUE | FALSE | TRUE | FALSE |
| RECEPTION 3 | 9.0 | 92 | 40 | 64 | 88 | FALSE | | TRUE | |

| RECEPTION | TIME (t) | TEETH POSITION AT RECEPTION (0-95) | | | | WHEEL POSITION SPECIFICATION LOGIC (TRUE or FALSE) | | | |
|---|---|---|---|---|---|---|---|---|---|
| | | FL | FR | RL | RR | FL | FR | RL | RR |
| RECEPTION 1 | 0.0 | 36 | 86 | 24 | 62 | — | — | — | — |
| RECEPTION 2 | 4.5 | 0 | 6 | 74 | 64 | FALSE | TRUE | FALSE | TRUE |
| RECEPTION 3 | 8.6 | 62 | 24 | 30 | 70 | | FALSE | | TRUE |

FIG. 8

| | SPRING TO AUTUMN | WINTER |
|---|---|---|
| ID | FIRST SET<br>1<br>2<br>3<br>4 | SECOND SET<br>5<br>6<br>7<br>8 |
| ASSUMPTION | FIRST ID REGISTRATION FOR SUMMER TIRES | ID REGISTRATION FOR WINTER TIRES |
| ID VERIFICATION | ◯ | ◯ |

FIG. 10

|  | SPRING TO AUTUMN | WINTER |
|---|---|---|
| ID | FIRST SET<br>1<br>2<br>3<br>4<br>9 | SECOND SET<br>5<br>6<br>7<br>8<br>9 |
| ASSUMPTION | FIRST ID REGISTRATION FOR SUMMER TIRES | ID REGISTRATION FOR WINTER TIRES |
| ID VERIFICATION | ○ | ○ |

FIG. 11

| ID | SPRING TO AUTUMN | WINTER | SPRING TO AUTUMN | |
|---|---|---|---|---|
| | FIRST SET<br>1<br>2<br>3<br>4 | SECOND SET<br>5<br>6<br>7<br>8 | FIRST SET<br>1<br>2<br>3<br>(4) [FAILURE] | THIRD SET<br>1<br>2<br>3<br>10 |
| ASSUMPTION | FIRST ID REGISTRATION FOR SUMMER TIRES | ID REGISTRATION FOR WINTER TIRES | ID SWITCHING | ONE-TIRE REPLACEMENT NEWLY REGISTER AUTOMATIC ID |
| ID VERIFICATION | ○ | ○ | ○ | |

FIG. 14A

| MAIN REGISTRATION FRAME | PAST FRAME | | | |
|---|---|---|---|---|
| | FIRST FRAME | SECOND FRAME | THIRD FRAME | FOURTH FRAME |
| 1 | UNREGISTERED | UNREGISTERED | UNREGISTERED | UNREGISTERED |
| 2 | UNREGISTERED | UNREGISTERED | UNREGISTERED | UNREGISTERED |
| 3 | UNREGISTERED | UNREGISTERED | UNREGISTERED | UNREGISTERED |
| 4 | UNREGISTERED | UNREGISTERED | UNREGISTERED | UNREGISTERED |
| 5 | UNREGISTERED | UNREGISTERED | UNREGISTERED | UNREGISTERED |

| MAIN REGISTRATION FRAME | PAST FRAME | | | |
|---|---|---|---|---|
| | FIRST FRAME | SECOND FRAME | THIRD FRAME | FOURTH FRAME |
| A | 1 | UNREGISTERED | UNREGISTERED | UNREGISTERED |
| B | 2 | UNREGISTERED | UNREGISTERED | UNREGISTERED |
| C | 3 | UNREGISTERED | UNREGISTERED | UNREGISTERED |
| D | 4 | UNREGISTERED | UNREGISTERED | UNREGISTERED |
| 5 | 5 | UNREGISTERED | UNREGISTERED | UNREGISTERED |

| MAIN REGISTRATION FRAME | PAST FRAME | | | |
|---|---|---|---|---|
| | FIRST FRAME | SECOND FRAME | THIRD FRAME | FOURTH FRAME |
| A | 1 | UNREGISTERED | UNREGISTERED | UNREGISTERED |
| B | 2 | UNREGISTERED | UNREGISTERED | UNREGISTERED |
| C | 3 | UNREGISTERED | UNREGISTERED | UNREGISTERED |
| D | 4 | UNREGISTERED | UNREGISTERED | UNREGISTERED |
| E | 5 | UNREGISTERED | UNREGISTERED | UNREGISTERED |

| TO BE REGISTERED | MAIN REGISTRATION FRAME | PAST FRAME | | | |
|---|---|---|---|---|---|
| | | FIRST FRAME | SECOND FRAME | | FOURTH FRAME |
| A | A | 1 | UNREGISTERED | ... | UNREGISTERED |
| B | B | 2 | UNREGISTERED | | UNREGISTERED |
| E | C | 3 | UNREGISTERED | | UNREGISTERED |
| F | D | 4 | UNREGISTERED | | UNREGISTERED |
| 5 | E | 5 | UNREGISTERED | | UNREGISTERED |

| MAIN REGISTRATION FRAME | PAST FRAME | | | |
|---|---|---|---|---|
| | FIRST FRAME | SECOND FRAME | THIRD FRAME | FOURTH FRAME |
| 1 | A | F | A | K |
| 2 | B | G | B | L |
| 3 | C | H | C | M |
| 4 | D | I | 6 | N |
| 5 | E | J | 7 | O |

| MAIN REGISTRATION FRAME | PAST FRAME | | | |
|---|---|---|---|---|
| | FIRST FRAME | SECOND FRAME | THIRD FRAME | FOURTH FRAME |
| 1 | A | F | K | P |
| 2 | B | G | L | Q |
| 3 | C | H | M | R |
| 4 | D | I | N | S |
| 5 | E | J | O | T |

FIG. 16B

RECEIVED ID

| FIRST FRAME | SECOND FRAME | THIRD FRAME | FOURTH FRAME |
|---|---|---|---|
| A | F | K | |
| B | | | Q |
| C | | | R |
| D | | N | S |
| E | | O | T |

WHEEL REGISTRATION APPARATUS AND TIRE PRESSURE MONITORING SYSTEM INCLUDING THE SAME

CROSS REFERENCE TO RELATED APPLICATION

The present application is a continuation application of International Patent Application No. PCT/JP2018/044364 filed on Dec. 3, 2018 which designated the U. S. and claims the benefit of priority from Japanese Patent Application No. 2018-81485 filed on Apr. 20, 2018, and Japanese Patent Application No. 2018-218619 filed on Nov. 21, 2018. The entire disclosures of all of the above applications are incorporated herein by reference.

TECHNICAL FIELD

The present disclosure relates to a wheel registration apparatus that identifies a signal of a subject vehicle among signals from a sensor transmitter attached to each of wheels and automatically registers the identified signal as a signal of the subject vehicle's wheel, and relates to a tire pressure monitoring system including a function of the registration.

BACKGROUND

As one of tire pressure monitoring systems (may also be referred to as TPMS), there has been a direct-type TPMS. In the TPMS of this type, a sensor transmitter equipped with various sensors such as a pressure sensor is directly attached to a wheel side where a tire is attached. In addition, an antenna and a receiver are provided on the vehicle body side, and when detection signals from various sensors are transmitted from the sensor transmitter, the detection signals are received by the receiver via the antenna, and the tire pressure is detected.

SUMMARY

The present disclosure describes a wheel registration apparatus applied to a vehicle in which four wheels, the wheel registration apparatus comprises: a transmitter that is provided on each of the four traveling wheels and has a first controller configured to create and transmit a frame including unique identification information; and a receiver that is provided on the vehicle body, receives the frames transmitted by the transmitters provided on the four traveling wheels via an antenna in a registration mode, and has a second controller configured to register four pieces of the identification information.

BRIEF DESCRIPTION OF DRAWINGS

FIG. 7A is a chart showing evaluation results of the wheel position.

FIG. 7B is a chart showing evaluation results of the wheel position.

FIG. 7C is a chart showing evaluation results of the wheel position.

FIG. 7D is a chart showing evaluation results of the wheel position.

FIG. 8 is a chart showing an example of an assumed case of ID registration processing.

FIG. 10 is a chart showing an example of the assumed case of the ID registration processing.

FIG. 11 is a chart showing an example of the assumed case of the ID registration processing described in a second embodiment.

FIG. 14A is a diagram showing an example of a memory structure at the time of vehicle shipment.

FIG. 14B is a diagram showing an example of a memory configuration when ID information of a new wheel set is registered.

FIG. 14C is a diagram showing a memory configuration example when a spare wheel is also replaced.

FIG. 14F is a diagram for explaining a case where, when ID information of a traveling wheel registered in a main registration frame and ID information of a traveling wheel to be registered are partially in common, the registered ID information is deleted.

FIG. 14G is a diagram showing a case where, when ID information of a traveling wheel registered in a main registration frame and ID information of a traveling wheel to be registered are partially in common, the registered ID information is also left.

FIG. 16A is a diagram showing an example of a memory configuration before a candidate set described in another embodiment is determined.

FIG. 16B is a diagram showing an example of a relationship between ID information received during a predetermined set time described in another embodiment and ID information of each wheel set stored in a past frame.

DETAILED DESCRIPTION

Figure 1:
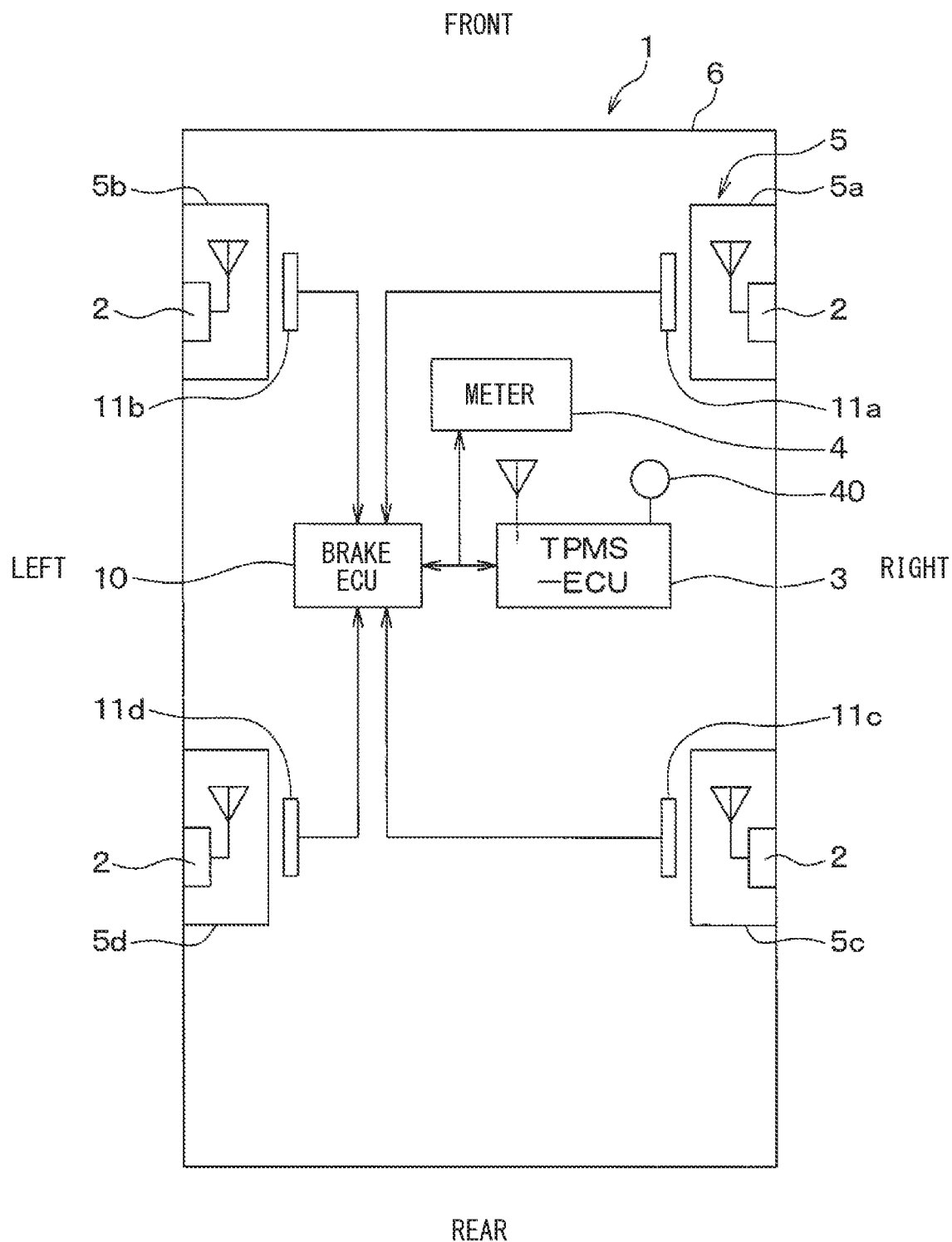
FIG. 1 is a block diagram showing an overall configuration of a tire pressure detection apparatus to which a wheel registration apparatus according to a first embodiment is applied.

As one of tire pressure monitoring systems (may also be referred to as TPMS), there has been a direct-type TPMS.

In such a direct-type TPMS, it may be necessary to be able to determine whether the transmitted data is data of the subject vehicle. Thus, identification information (may also be referred to as ID information) for determining whether the vehicle is the subject vehicle or another vehicle is individually provided in the data transmitted by the sensor transmitter.

In order to determine whether the ID information included in the transmitted data is that of the subject vehicle, it may be necessary to register the ID information of each sensor transmitter on the receiver side in advance. For this reason, at the time of winter tire replacement, it may be necessary to re-register the ID information of the sensor transmitter in the receiver. In this case, as a registration method, a typical one may be, for example, a method of performing the registration by using a tool communicable with a TPMS electronic control unit (may also be referred to as TPMS-ECU) which is mounted on a vehicle at an automobile maintenance site such as a dealer, but there has been studied a method of making the registration automatic.

For example, in a device shown in a related art, four wheels are taken as one set, multiple wheel sets to be replaced by tire replacement are determined in advance, and ID information of four wheels included in each wheel set is stored in advance in a memory portion provided in a receiver. For example, ID information of a wheel set for summer tires and ID information of a wheel set for winter tires are stored in a memory portion. After a user replaces summer tires with winter tires, and when a vehicle is traveling at a predetermined vehicle speed or more, it is determined in the receiver whether ID information included in data received within a predetermined time match with all pieces of ID information of sensor transmitters stored in the memory portion and corresponding to unmounted wheels. When all pieces of information are matched, the pieces of ID information of the wheels registered in the memory portion as the current mounted wheels are automatically changed to the ID information of the wheel set for winter tires which have been unmounted wheels.

Unless the vehicle is traveled for a predetermined time after the tire replacement, the ID information of the wheel after replacement may not be registered. It may be desired that ID information can be registered in a short time even when the vehicle is not traveled.

The present disclosure describes a wheel registration apparatus that can register ID information of a sensor transmitter attached to a wheel of a subject vehicle earlier and does not need to perform registration by using a tool each time of tire replacement, and describes a TPMS having the function of the wheel registration apparatus.

A wheel registration apparatus according to one aspect of the present disclosure may be applied to a vehicle in which four traveling wheels provided with tires are attached to a vehicle body, the wheel registration apparatus may comprise: a transmitter that is provided on each of the four traveling wheels and has a first controller configured to create and transmit a frame including unique ID information; and a receiver that is provided on the vehicle body, receives the frames transmitted by the transmitters provided on the four traveling wheels via a reception antenna in a registration mode, and has a second controller configured to register four pieces of the ID information included in the respective frames as pieces of ID information of the transmitters provided on current four traveling wheels. In this configuration, in the registration mode, the second controller registers the four pieces of the ID information included in the frames transmitted by the transmitters provided on the four traveling wheels as one wheel set, and registers a plurality of the wheel sets in response to that tire replacement is performed; in response to that the registration mode is entered again after the plurality of the wheel sets are registered, the second controller takes as a pre-replacement set, the wheel set registered when the registration mode is entered and determines a candidate set from the wheel set registered in past and different from the pre-replacement set among the plurality of the wheel sets; and upon reception of the frames including the four pieces of the ID information included in the candidate set, the second controller registers the four pieces of the ID information included in the candidate set as pieces of ID information of the transmitters provided on the current four traveling wheels.

As thus described, the candidate set is determined not from the pre-replacement set with ID information registered in the registration mode, that is, the wheel set before tire replacement, but from the wheel sets registered in the past which is prior to the time before the tire replacement. When the frames including four pieces of ID information included in the candidate set are received, the four pieces of ID information are newly registered as the pieces of identification information of the transmitters attached to the current four traveling wheels. With such a method, the wheel position cannot be specified, but new ID registration is possible without traveling the vehicle. Therefore, it is possible to register the ID information of the transmitter attached to the traveling wheel of the subject vehicle earlier, and it is not necessary to perform the registration by using a tool each time the tires are replaced.

Hereinafter, embodiments of the present disclosure will be described with reference to the drawings. In the following embodiments, a description will be given while the same reference numerals are added to the same or equivalent portion.

First Embodiment

Hereinafter, a first embodiment of the present disclosure will be described with reference to the drawings. FIG. 1 is a diagram showing an overall configuration of a TPMS to which a wheel registration apparatus according to the first embodiment of the present disclosure is applied. The upper direction in the drawing of FIG. 1 corresponds to the front of a vehicle 1, and the lower direction of the drawing corresponds to the rear of the vehicle 1. With reference to this figure, the TPMS in the present embodiment will be described.

As shown in FIG. 1, the TPMS is provided in the vehicle 1 and includes a transmitter 2, an ECU for TPMS (may also be referred to as a TPMS-ECU) 3 that serves as a receiver, and a meter 4. By registering ID information of the transmitter 2 attached to each of traveling wheels 5a to 5d of the subject vehicle, the wheel registration apparatus can discriminate information on tire pressure, transmitted from the transmitter 2 of the subject vehicle, from that of the other vehicle. Incidentally, the traveling wheel of the subject vehicle may be referred to as a vehicle wheel. Here, when a user performs a registration mode operation for registering ID information by operating a registration switch 40, the wheel registration apparatus shifts to the registration mode to register ID information. Note that the shift to the registration mode is not limited to the operation of the registration switch 40, but a tool or the like may be used, or the mode shift may be automatically performed when a predetermined condition is satisfied, for example, when the vehicle is stopped for a predetermined time or more.

The ID information may be preferably registered after specifying the wheel position indicating which of the traveling wheels 5a to 5d each transmitter 2 is attached to. However, even if the wheel position is not specified, when the ID information of the transmitter 2 attached to each of the traveling wheels 5a to 5d of the subject vehicle can be registered, it is possible to know that the tire pressure has been decreased on any of the traveling wheels 5a to 5d of the subject vehicle. For this reason, the registration of the ID information here means that the registration is performed by at least identifying the ID information of the transmitter 2 of the subject vehicle even at a stage where the wheel position has not been able to be specified. Naturally, the registration of the ID information includes a case where the wheel position is specified and the registration is performed associating the ID information of each transmitter 2 with the position of each of the traveling wheels 5a to 5d to which each transmitter 2 is attached.

In the present embodiment, the wheel registration apparatus specifies the wheel position by acquiring gear information obtained from each of detection signals of the wheel speed sensors 11a to 11d provided corresponding to the traveling wheels 5a to 5d. Then, when the wheel position is specified, the ID information of the transmitter 2 of each of the four traveling wheels 5a to 5d is registered in association with each of the traveling wheels 5a to 5d to which each transmitter 2 is attached. Also, the pieces of ID information of the transmitter 2 attached to the four traveling wheels 5a to 5d, that is, four pieces of ID information, are registered as one wheel set. For example, when a tire with the transmitter 2 as a whole is replaced, as in the case of summer tires and winter tires, the ID registration is performed for those tires as different wheel sets. Even if the wheel position has not yet been specified when the registration switch 40 is operated, the ID registration of the wheel set is performed so long as which wheel set can be identified. The ID registration will be described in detail later. First, a description will be given of each part constituting the TPMS that includes the wheel registration apparatus. As shown in FIG. 1, the transmitter 2 is attached to each of the traveling wheels 5a to 5d. The transmitter 2 detects the air pressure of the tire attached to each of the traveling wheels 5a to 5d, and stores and transmits information on the tire pressure indicating the detection result into the frame together with the unique ID information of each transmitter 2.

On the other hand, the TPMS-ECU 3 is attached to the vehicle body 6 side of the vehicle 1, receives the frame transmitted from the transmitter 2, and performs various kinds of processing and calculations on the basis of the detection signal stored the frame, to perform the ID registration processing and the tire pressure detection.

For example, the transmitter 2 creates a frame by frequency shift keying (FSK), and the TPMS-ECU 3 demodulates the frame to read the data in the frame and performs the ID registration processing and the tire pressure detection.

Figure 2A:
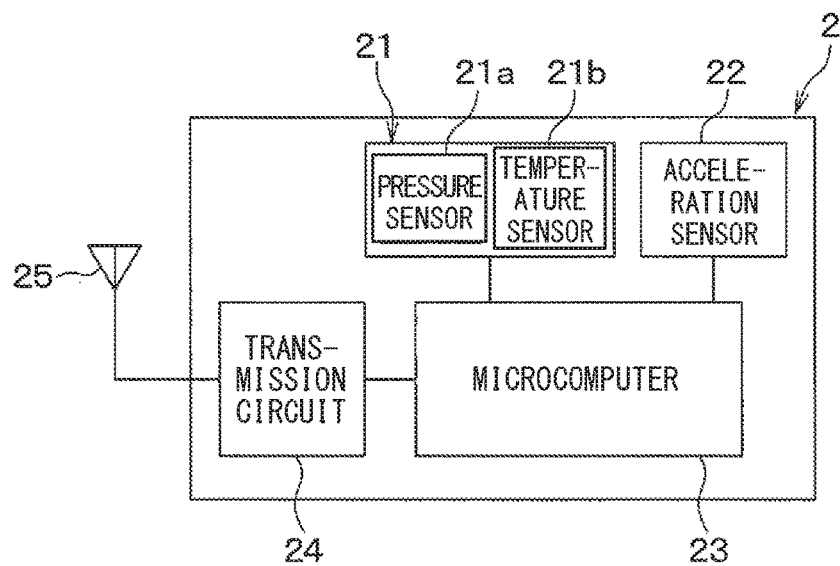
FIG. 2A is a block diagram showing a detail of a sensor transmitter.

As shown in FIG. 2A, the transmitter 2 is configured to include a sensing portion 21, an acceleration sensor 22, a microcomputer 23, a transmission circuit 24, and a transmission antenna 25. Each part is driven on the basis of power supply from a battery (not shown).

The sensing portion 21 is configured to include a pressure sensor 21a and a temperature sensor 21b, for example, and outputs a detection signal in accordance with tire pressure and a detection signal in accordance with a temperature. The acceleration sensor 22 is used to detect the position of the sensor itself on each of the traveling wheels 5a to 5d to which the transmitter 2 is attached, that is, to detect the position of the transmitter 2 and the vehicle speed. The acceleration sensor 22 of the present embodiment outputs a detection signal corresponding to the acceleration in the radial direction of each of the traveling wheels 5a to 5d, that is both directions vertical to the circumferential direction, among the accelerations that act on the traveling wheels 5a to 5d during the rotation of the traveling wheels 5a to 5d, for example.

The microcomputer 23 corresponds to the first controller and is a known computer including a computer processing unit (CPU), a read-only memory (ROM), a random-access memory (RAM), input/output (I/O), and the like. The microcomputer 23 executes predetermined processing in accordance with a program stored in a memory corresponding to a non-transitional tangible storage medium such as a ROM. The memory in the microcomputer 23 stores individual ID information including ID information unique to the transmitter for identifying each transmitter 2 and ID information unique to the vehicle for identifying the subject vehicle.

The microcomputer 23 receives the detection signal concerning the tire pressure from the sensing portion 21, performs signal processing on the received signal while processing the signal as necessary, and stores the information on the tire pressure into the frame together with the ID information of each transmitter 2. After creating the frame, the microcomputer 23 performs the processing of transmitting a frame from the transmission antenna 25 to the TPMS-ECU 3 via the transmission circuit 24, that is, performing data transmission.

Transmitter 2 does not know the state of the TPMS-ECU 3, such as a state where TPMS-ECU 3 has shifted to the registration mode, and performs the frame transmission processing that can cope with a case where the TPMS-ECU 3 has shifted to the registration mode. In the case of the present embodiment, as will be described later, the ID registration is performed while the vehicle is stopped or during a predetermined time after the vehicle starts traveling. For this reason, the frame transmission processing is performed on the assumption that the TPMS-ECU 3 may have been shifted to the registration mode while the vehicle is stopped or during the predetermined time after the vehicle starts traveling.

For example, the microcomputer 23 detects the vehicle speed by monitoring the detection signal of the acceleration sensor 22. When the microcomputer 23 detects that the vehicle speed is 0, that is, the vehicle is stopped, by detecting the vehicle speed, or when the stop time exceeds a predetermined time, the microcomputer 23 enters the registration mode and transmits the frame in the transmission cycle for ID registration.

The microcomputer 23 also detects the position of the transmitter 2 on each of the traveling wheels 5a to 5d to which each transmitter 2 is attached by monitoring the detection signal of the acceleration sensor 22. The position detection means angle detection for detecting, in each of the traveling wheels 5a to 5d, an angle at which the acceleration sensor 22 exists around the central axis of each of the traveling wheels 5a to 5d, in other words, an angle at which the transmitter 2 exists (may also be referred to as a presence angle). The microcomputer 23 performs the frame transmission on the basis of the position detection result of the transmitter 2 when the vehicle 1 starts traveling.

Specifically, while the vehicle 1 is traveling, the microcomputer 23 repeatedly performs the frame transmission on the basis of the detection signal of the acceleration sensor 22 at a timing at which the presence angle of the acceleration sensor 22 becomes a predetermined angle. That is, the microcomputer 23 determines that the vehicle 1 is traveling on the basis of the vehicle speed detection result, and determines that the presence angle of the acceleration sensor 22 has become a predetermined angle on the basis of the position detection result of the transmitter 2 based on the detection signal of the acceleration sensor 22.

For example, the microcomputer 23 determines that the vehicle 1 is traveling when the vehicle speed reaches a predetermined speed, for example, 5 km/h or more. The output of the acceleration sensor 22 includes acceleration based on centrifugal force (may also be referred to as centrifugal acceleration). The vehicle speed can be calculated by integrating the centrifugal acceleration and multiplying the integrated value by a coefficient. For this reason, the microcomputer 23 calculates the centrifugal acceleration by removing a gravitational acceleration component from the output of the acceleration sensor 22, and calculates the vehicle speed on the basis of the centrifugal acceleration.

In addition, since the detection signal of the acceleration sensor 22 is a signal corresponding to the rotation of each of the traveling wheels 5a to 5d, during the traveling, the detection signal becomes a signal including a gravitational acceleration component and having an amplitude corresponding to the wheel rotation. For example, the amplitude of the detection signal is a negative maximum amplitude when the transmitter 2 is located at the upper position around the central axis of the traveling wheels 5a to 5d, is zero when the transmitter 2 is located at the horizontal position, and is a positive maximum amplitude when the transmitter 2 is located at the lower position. Thus, on the basis of this amplitude, the presence angle of the acceleration sensor 22 can be detected, and for example, it is possible to know as the presence angle an angle formed by the acceleration sensor 22, which is set to 0° when the acceleration sensor 22 is located at the upper position around the central axis of each of the traveling wheels 5a to 5d.

Then, the presence angle at the time when the vehicle speed reaches the predetermined speed is set as the predetermined angle, or the time when the presence angle of the acceleration sensor 22 becomes the predetermined angle after the vehicle speed reaches the predetermined speed may be set as the start timing, and the frame transmission may be performed from each transmitter 2. Further, the frame transmission is repeatedly performed taking, as the transmission timing, the timing when the angle formed by the acceleration sensor 22 becomes the same angle as the first frame transmission. Note that the transmission timing may be set each time the angle formed by the acceleration sensor 22 becomes the same angle as the first frame transmission. However, in consideration of the battery life, it may be preferable that frame transmission be not always performed each time the angle is reached, but frame transmission be performed only force in each predetermined time, for example, 15 seconds.

Further, when a predetermined time, for example, a few minutes elapses after the vehicle 1 starts traveling, it is assumed that the ID registration has been completed, and the mode is switched to a periodic transmission mode, and the frame transmission is performed in each predetermined periodic transmission cycle. For example, when the mode is switched to the periodic transmission mode, the frame transmission is performed in each periodic transmission cycle, which is longer than the ID registration mode, for example, every one minute, whereby a signal concerning the tire pressure is periodically transmitted to the TPMS-ECU 3 side. At this time, for example, by providing a random delay for each transmitter 2, it is possible to shift the transmission timing of each transmitter 2, and to prevent the TPMS-ECU 3 side from being unable to receive frames due to radio wave interference from multiple transmitters 2.

The transmission circuit 24 functions as an output part that transmits the frame transmitted from the microcomputer 23 to the TPMS-ECU 3 through the transmission antenna 25. For the frame transmission, for example, radio waves in the radio frequency (RF) band may be used.

The transmitter 2 configured as described above is attached to, for example, an air injection valve in each of the traveling wheels 5a to 5d and is disposed so that the sensing portion 21 is exposed inside the tire. Then, the transmitter 2 detects the tire pressure of each of the traveling wheels 5a to 5d to which the transmitter 2 is attached. In the ID registration mode, the frame transmission is repeatedly performed in the transmission cycle for ID registration through the transmission antenna 25 provided in each transmitter 2. Thereafter, when the mode is switched to the periodic transmission mode, the frame transmission is repeatedly performed in each transmission cycle.

Figure 2B:
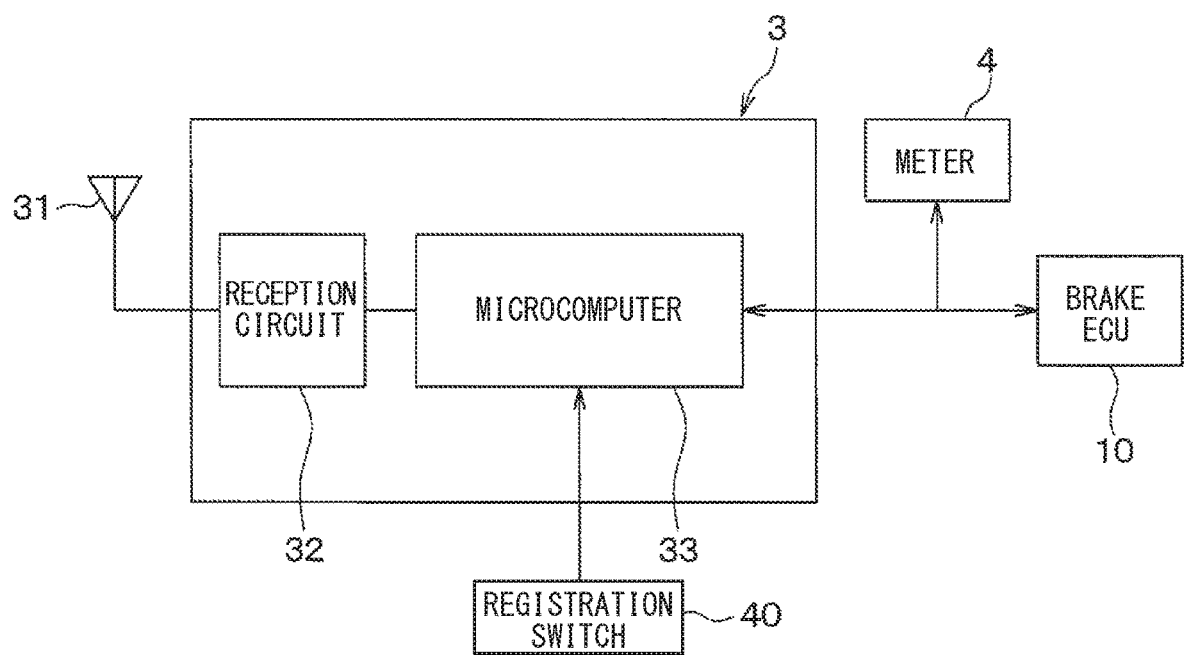
FIG. 2B is a block diagram showing a detail of a receiver.

Further, as shown in FIG. 2B, the TPMS-ECU 3 is configured to include a reception antenna 31, a reception circuit 32, a microcomputer 33, and the like. The TPMS-ECU 3 performs the ID registration of each transmitter 2 of the subject vehicle or receives a frame transmitted from each transmitter 2 to detect tire pressure.

The reception antenna 31 is an antenna for receiving a frame transmitted from each transmitter 2. The reception antenna 31 is fixed to the vehicle body 6 and may be an internal antenna disposed in the main body of the TPMS-ECU 3, or may be an external antenna in which wiring is extended from the main body.

The reception circuit 32 functions as an input part that receives a transmission frame from each transmitter 2 received by the reception antenna 31 and transmits the frame to the microcomputer 33. When receiving the frame through the reception antenna 31, the reception circuit 32 transmits the received signal to the microcomputer 33.

The microcomputer 33 corresponds to the second controller. The microcomputer 33 is a known computer including a CPU, a ROM, a RAM, an I/O, and the like and executes the ID registration processing or the tire pressure detection in accordance with a program stored in a memory corresponding to a non-transitional tangible storage medium such as a ROM.

In the case of the present embodiment, the microcomputer 33 performs the ID registration using two methods. One is an ID registration method based on the detection signals of the wheel speed sensors 11a to 11d (may also be referred to as a first method), and the other is an ID registration method based on the registered wheel set (may also be referred to as a second method). In the ID registration mode, the TPMS-ECU 3 performs both the first method and the second method, and on the basis of the result earlier of the two methods, the TPMS-ECU 3 determines that the ID information is for the transmitters 2 attached to at least the four traveling wheels 5a to 5d of the subject vehicle and performs the ID registration. Although an example of the ID registration by the first method is shown here, any method can be used for the ID registration method by the first method.

The first method is for registering the ID information of the transmitter 2 by specifying, on the basis of the detection signals of the wheel speed sensors 11*a* to 11*d*, the wheel position indicating which of the four traveling wheels 5*a* to 5*d* of the subject vehicle each transmitter 2 is attached to. However, the first method cannot be used while the vehicle is stopped, and can only be used after the vehicle 1 starts traveling.

The second method is for performing the ID registration on the basis of the registered wheel set and can only be used after the wheel set is registered. When the second method is used, although the wheel position cannot be specified, the ID information of the transmitter 2 attached to each of the four traveling wheels 5*a* to 5*d* of the subject vehicle can be identified even when the vehicle is stopped. For this reason, the ID information of the transmitter 2 attached to each of the four traveling wheels 5*a* to 5*d* of the subject vehicle can be identified earlier by the second method than by the first method. Therefore, while performing the ID registration in the first method and the second method at the same time, the TPMS-ECU 3 first performs the ID registration in the earlier method, and when the wheel position cannot be specified, the TPMS-ECU 3 again performs the ID registration with the wheel position specified.

First, the outline of the first method will be described. The TPMS-ECU 3 acquires gear information from a brake ECU 10 to be described later through an in-vehicle LAN such as CAN for ID registration by the first method. Then, the microcomputer 33 specifies the wheel position on the basis of the relationship between the gear information acquired from the brake ECU 10 and the reception timing at which the transmission frame from each transmitter 2 is received. For example, the microcomputer 33 acquires the gear information of the wheel speed sensors 11*a* to 11*d* provided corresponding to the traveling wheels 5*a* to 5*d*, in addition to the wheel speed information of the traveling wheels 5*a* to 5*d*, from the brake ECU 10 in a predetermined cycle, for example, every 10 ms.

The "gear information" is information indicating a tooth position of a gear rotated together with each of the traveling wheels 5*a* to 5*d*. The "tooth position" means a tooth rotation state indicated by the number of tooth edges or the number of teeth of the gear, in other words, the rotation angle, and is a value corresponding to the presence angle of each transmitter 2. The wheel speed sensors 11*a* to 11*d* are configured of, for example, electromagnetic pickup sensors disposed facing the gear teeth, and change detection signals with passage of the gear teeth. The wheel speed sensors 11*a* to 11*d* of such a type output square pulse waves corresponding to the passage of teeth as detection signals, and hence the rising and falling of the square pulse waves represent the passage of the tooth edges of the gear. For this reason, the brake ECU 10 counts the number of tooth edges of the gear, that is, the number of passage of the edges, from the number of rising and falling of the detection signals of the wheel speed sensors 11*a* to 11*d*. Then, as the gear information indicating the tooth position, the brake ECU 10 transmits, for example, the number of tooth edges at that time to the microcomputer 33 in each predetermined cycle. As a result, the microcomputer 33 is able to know which tooth of the gear has passed.

The number of tooth edges is reset each time the gear rotates once. For example, when the number of teeth provided on the gear is 48, the number of edges is counted in a total of 96 from 0 to 95, and when the count value reaches 95, the count value is returned to 0, and the number of edges is counted again.

Here, a case will be described where the number of tooth edges of the gear is transmitted from the brake ECU 10 to the microcomputer 33 as the gear information, but the number of teeth which is a count value of the number of passage of the teeth may be used. Also, the number of edges that have passed during a predetermined cycle may be transmitted to the microcomputer 33, the microcomputer 33 may be caused to add the number of edges having passed during the predetermined cycle to the previous number of edges, and count the number of edges in that cycle. Naturally, in this case as well, the number of teeth can be used instead of the number of edges. That is, it is only necessary that the microcomputer 33 can finally acquire the number of edges or the number of teeth in the cycle as the gear information. The brake ECU 10 resets the number of tooth edges or the number of teeth of the gear each time the power is turned off and starts the counting again when the power is turned on or when the vehicle speed becomes a predetermined vehicle speed after the power is turned on. Thus, even when the reset is made each time the power is turned off, the same tooth is represented by the same number of edges or the same number of teeth while the power is turned on.

Then, the microcomputer 33 measures the reception timing when the frame transmitted from each transmitter 2 is received, and specifies the wheel position on the basis of the number of gear edges at the frame reception timing from the acquired gear edge numbers. A specific method for specifying the wheel position will be described later in detail, and this makes it possible to specify which of the traveling wheels 5*a* to 5*d* each transmitter 2 is attached to. This is the first method.

When the microcomputer 33 uses the first method to specify which of the traveling wheels 5*a* to 5*d* each transmitter 2 is attached to and performs the ID registration associating the ID information of each transmitter 2 with the position of each of the traveling wheels 5*a* to 5*d* to which each transmitter 2 is attached. Further, the microcomputer 33 registers four pieces of ID information for which ID registration has been performed as one wheel set. When a wheel set with four different pieces of ID information has been registered before, while those pieces of information are remained, the wheel set with four pieces of ID information registered this time is registered again. In this way, the microcomputer 33 can, for example, store a wheel set for four pieces of ID information of summer tires as a first set, and store a wheel set for four pieces of ID information of winter tires as a second set.

Next, the outline of the second method will be described. When performing the ID registration by the second method, the microcomputer 33 uses the information of the wheel set, including four pieces of ID information for which the ID registration has been performed by the first method. Here, the microcomputer 33 applies the second method when two or more wheel sets are stored.

There is a high possibility that the user presses the registration switch 40 to perform the ID registration at the time of replacing the summer tire with the winter tire or vice versa. For this reason, when the registration switch 40 is pressed, the candidate set is determined not from the wheel set (may also be referred to as pre-replacement set) into which ID was registered at a stage before tire replacement, but from the wheel set ID-registered in the past which is prior to a stage before the tire replacement. When all the frames including four pieces of ID information included in the candidate set are received, it is considered that the tire has been replaced with the candidate set. For this reason, when all the frames including four pieces of ID information included in the candidate set are received, the four pieces of ID information are newly registered as the ID information of the transmitters 2 attached to the current four traveling wheels 5a to 5d. This is the second method.

In such ID registration by the second method, the wheel position cannot be specified, but a new ID can be registered without traveling the vehicle 1. Hence the ID information of the transmitters 2 attached to the traveling wheels 5a to 5d of the subject vehicle can be registered earlier.

When multiple wheel sets ID-registered in the past is provided, the candidate set is determined from those. Here, when ID information registered in the past is received, a wheel set including the ID information is selected as the target set, and the candidate set is determined from the target set. When there is one target set, the target set is determined as the candidate set, but there may be multiple target sets. Even in that case, for example, when four pieces of ID information of all the frames received which include four pieces of ID information in the target set are registered, the ID registration can be performed while the vehicle is stopped. However, there may be a case where wheels of multiple target sets are stored in the vicinity of the vehicle 1, and in that case, all frames including four pieces of ID information for the multiple target sets may be received. Therefore, here, when multiple target sets is provided, among the multiple target sets, one having received a frame including ID information even when the vehicle 1 is in a traveling state is determined as the candidate set. When the frames including four pieces of ID information included in the candidate set are received, the four pieces of ID information are registered.

When the ID registration is performed in this way, the TPMS-ECU 3 then detects the tire pressure of each of the traveling wheels 5a to 5d on the basis of the ID information stored in the transmission frame from each transmitter 2 and the data on the tire pressure. Then, the TPMS-ECU 3 outputs an electrical signal corresponding to the tire pressure to the meter 4 through the in-vehicle LAN such as CAN. For example, the microcomputer 33 detects a decrease in tire pressure by comparing the tire pressure with a predetermined threshold Th, and when detecting a decrease in the tire pressure, the microcomputer 33 outputs a signal to that effect to the meter 4. As a result, the meter 4 is notified that the tire pressure of any of the four traveling wheels 5a to 5d has decreased.

The meter 4 functions as an alarm portion, is disposed in a place where the user can visually recognize as shown in FIG. 1, and is configured of a meter display or the like installed in an instrument panel in the vehicle 1, for example. For example, when a signal indicating that the tire pressure has decreased is transmitted from the microcomputer 33 in the TPMS-ECU 3 to the meter 4, the meter 4 performs display indicating that the tire pressure has decreased to notify the user of the decrease in the tire pressure of a specific wheel.

After the wheel position is specified by the first method, the tire pressure can be detected by specifying each of the traveling wheels 5a to 5d. Therefore, in that case, it is possible to specify the wheel in which the tire pressure has decreased and to notify the meter 4 of the wheel. Since the wheel position cannot be specified by the second method, it can only be detected that the tire pressure has decreased at any of the traveling wheels 5a to 5d until the specification of the wheel position by the first method is completed. However, since being at least notified that there is a wheel with reduced tire pressure, the user can adjust the tire pressure on the basis of the notification.

Subsequently, the operation of the TPMS of the present embodiment will be described. Hereinafter, the operation of the TPMS will be described, and the description will be given by dividing the operation into the ID registration processing and tire pressure detection performed in the TPMS. First, a specific method for the ID registration processing will be described with reference to FIGS. 3 to 7

On the transmitter 2 side, the microcomputer 23 monitors the detection signal of the acceleration sensor 22 in each predetermined sampling cycle on the basis of the power supply from the battery, thereby detecting the vehicle speed and the angle of the acceleration sensor 22 in each of the traveling wheels 5a to 5d.

When the vehicle speed is 0 and the vehicle is stopped, the microcomputer 23 performs the frame transmission at a transmission cycle for ID registration. Further, when the vehicle speed reaches a predetermined speed, the microcomputer 23 repeatedly performs the frame transmission at a timing at which the angle of the acceleration sensor 22 becomes a predetermined angle. For example, the time when the vehicle speed reaches the predetermined speed is set as the predetermined angle, or the time when the angle of the acceleration sensor 22 becomes the predetermined angle after the vehicle speed reaches the predetermined speed is set as the start timing, and the frame transmission is performed from each transmitter 2. The frame transmission is repeatedly performed taking, as the transmission timing, the timing when the angle formed by the acceleration sensor 22 becomes the same angle as the first frame transmission.

Figure 3:
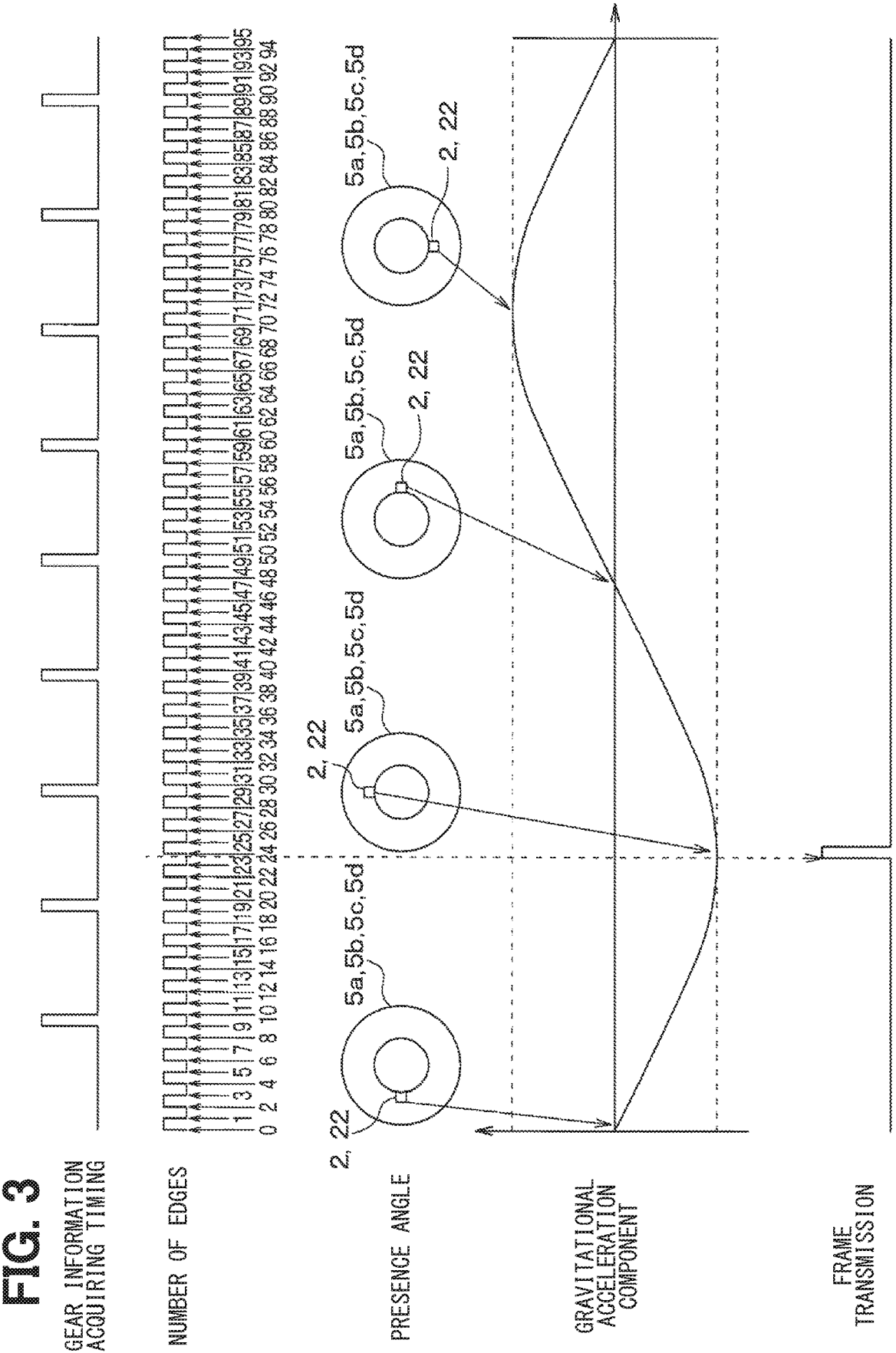
FIG. 3 is a timing chart for explaining specification of a wheel position.

That is, when the gravitational acceleration component of the detection signal of the acceleration sensor 22 is extracted, a sin wave as shown in FIG. 3 is obtained. On the basis of the sin wave, the angle of the acceleration sensor 22 is found. For this reason, the frame transmission is performed at the timing at which the acceleration sensor 22 has the same angle on the basis of the sin wave.

Figure 4:
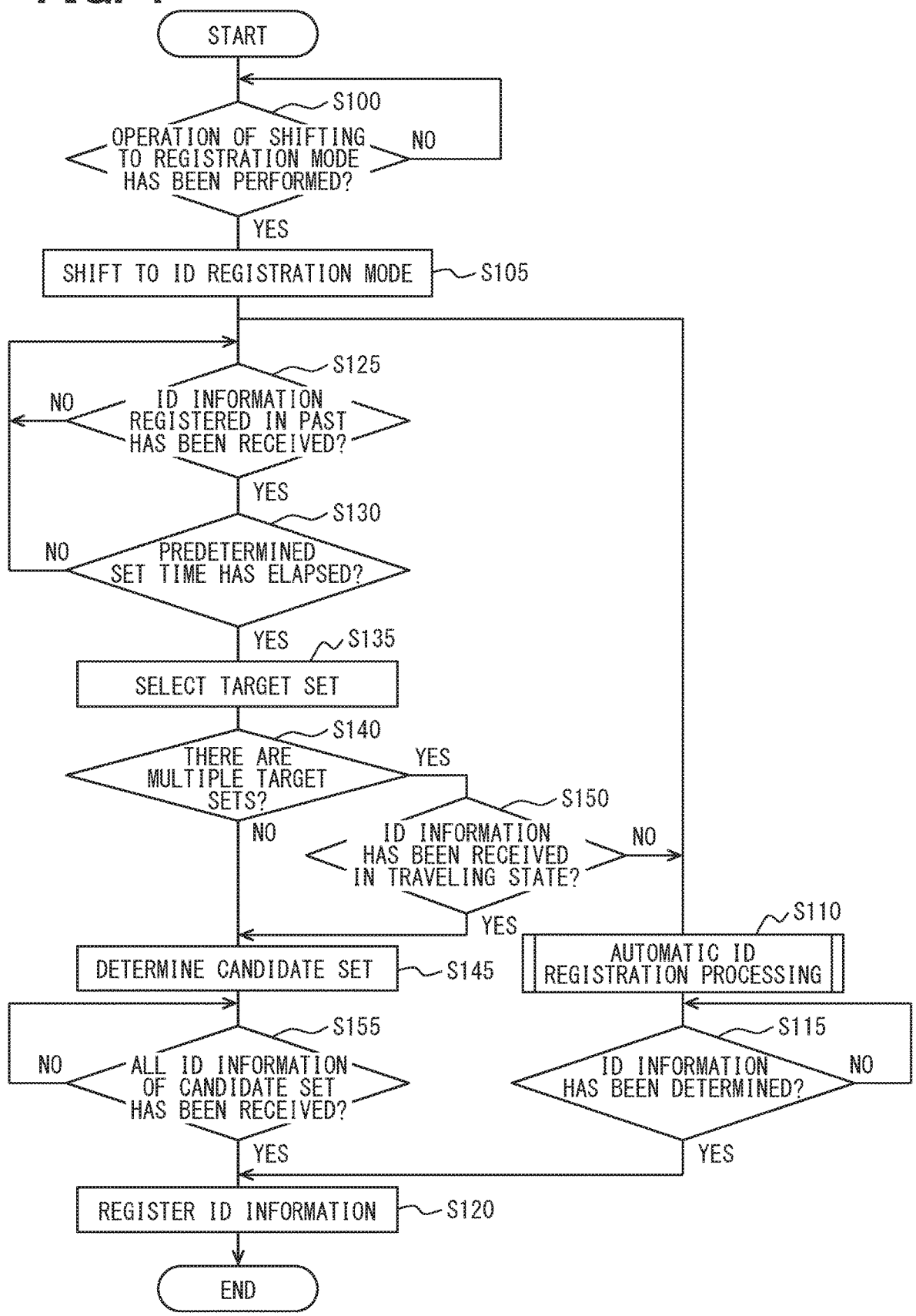
FIG. 4 is a flowchart showing a detail of ID registration processing.

On the other hand, on the TPMS-ECU 3 side, when a start switch of the vehicle 1 such as an ignition switch (not shown) is operated, the microcomputer 33 executes the ID registration processing shown in FIG. 4 in each predetermined control cycle, for example.

In step S100, it is determined whether the registration switch 40 has been operated, that is, whether an operation for shifting to the registration mode has been performed. When an affirmative determination is made here, the processing proceeds to step S105 to shift to the ID registration mode, and when a negative determination is made, the processing of step S100 is repeated. Then, after the shift to the registration mode, a flow for performing the ID registration by the first method and a flow for performing ID registration by the second method are performed simultaneously in parallel.

First, as the flow for performing the ID registration by the first method, the processing of specifying the wheel position on the basis of detection signals from the wheel speed sensors 11a to 11d and performing the ID registration will be described.

Specifically, in step S110, automatic ID registration processing by the first method is performed. The microcomputer 33 acquires the gear information of the wheel speed sensors 11a to 11d provided corresponding to the traveling wheels 5a to 5d from the brake ECU 10 in a predetermined cycle, for example, every 10 ms. Then, the microcomputer 33 measures the reception timing when the frame transmitted from each transmitter 2 is received, and acquires the number of gear edges at the frame reception timing from the acquired number of gear edges.

At this time, the frame reception timing transmitted from each transmitter 2 does not always match with the cycle in which the gear information is acquired from the brake ECU 10. In this case, the number of gear edges indicated by the gear information acquired in the cycle closest to the frame reception timing, that is, the cycle immediately before or immediately after the frame reception timing, among the cycles in which the gear information is acquired from the brake ECU 10 is used as the number of gear edges at the frame reception timing. In addition, the number of gear edges at the frame reception timing may be calculated using the number of gear edges indicated by the gear information acquired in the cycle immediately before or immediately after the frame reception timing among the cycles in which the gear information is acquired from the brake ECU 10. For example, an intermediate value of the number of gear edges indicated by the gear information acquired in the cycle immediately before or immediately after the frame reception timing can be used as the number of gear edges at the frame reception timing.

The operation of acquiring the number of gear edges at the frame reception timing is repeated each time the frame is received, and the wheel position is specified on the basis of the number of gear edges at the received frame reception timing. Specifically, the wheel position is specified by determining whether the variation in the number of gear edges at the frame reception timing is within a predetermined range set on the basis of the number of gear edges at the previous reception timing.

For the wheel from which the frame has been received, since the frame is transmitted at the timing when the angle of the acceleration sensor 22 becomes a predetermined angle, the tooth position indicated by the number of gear edges at the frame reception timing almost matches with that in the previous time. For this reason, the variation in the number of gear edges at the frame reception timing is small and falls within a predetermined range. This also applies to a case where frames are received multiple times, and the variation in the number of gear edges at the reception timing of each frame falls within a predetermined range determined at the first frame reception timing. On the other hand, for a wheel different from the wheel from which the frame has been received, the tooth position indicated by the number of gear edges at the frame reception timing transmitted from the transmitter 2 of the other wheel varies.

That is, since the rotation of the gears of the wheel speed sensors 11a to 11d is linked to the traveling wheels 5a to 5d, for the wheel from which the frame has been received, the tooth position indicated by the number of gear edges at the frame reception timing is almost the same. However, the rotation states of the traveling wheels 5a to 5d varies depending on road conditions, turning, lane change, or the like, and therefore, the rotation states of the traveling wheels 5a to 5d cannot be completely the same. For this reason, for the wheel different from the wheel from which the frame has been received, the tooth position indicated by the number of gear edges at the frame reception timing varies.

Figure 5:
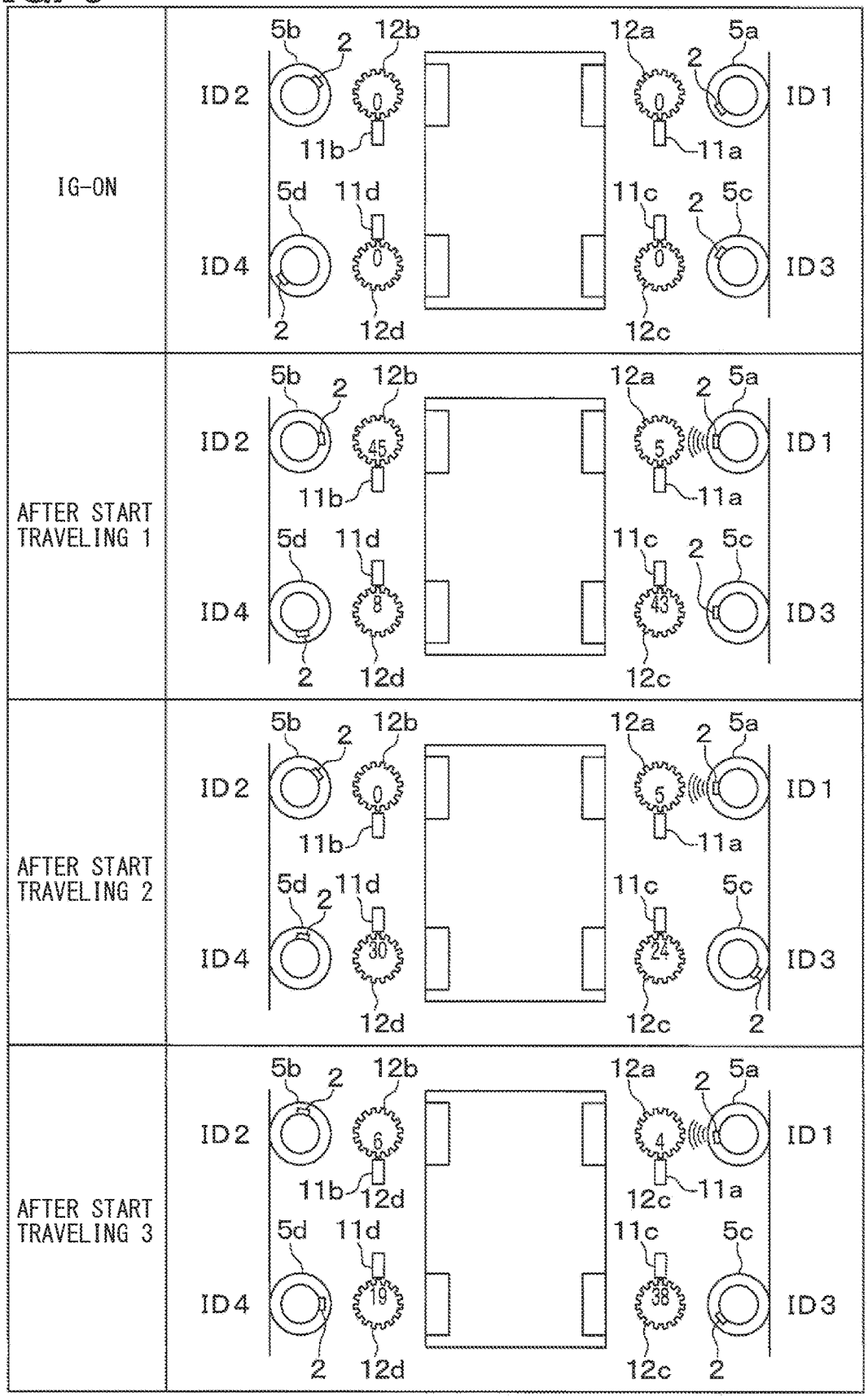
FIG. 5 is an image diagram showing a change in gear information.

Therefore, as shown in FIG. 5, from the state where the number of edges of the gears 12a to 12d is 0 when the start switch is turned on, for the wheel different from the wheel from which the frame has been gradually received after the start of traveling, the number of edges at the frame reception timing varies. As shown in FIG. 5, when the transmitter 2 having transmitted the frame is attached to the right front wheel 5a, the variation in the number of edges of the other wheels becomes large. The wheel position is specified by determining whether the variation is within a predetermined range.

Figure 6A:
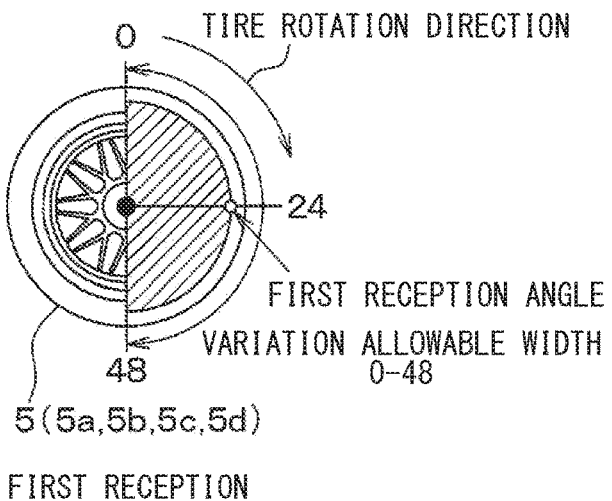
FIG. 6A is a schematic view illustrating a specification logic for the wheel position.
Figure 6B:
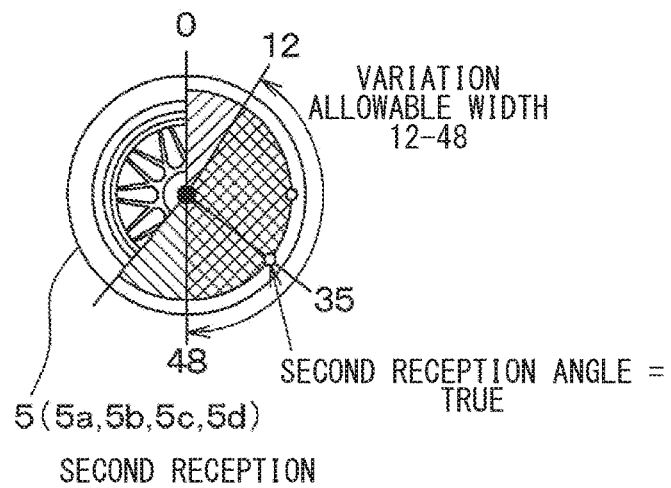
FIG. 6B is a schematic view illustrating a specification logic for the wheel position.

For example, as shown in FIG. 6A, it is assumed that the position of the transmitter 2 at the time of first frame transmission is a first reception angle. Further, it is assumed that the variation allowable width, which is an allowable width as the variation in the number of gear edges, is a value corresponding to a range of 180° centered on the first reception angle, that is, a range of ±90° of the first reception angle. In the case of the number of edges, it is assumed that the number of edges is ±24 around the number of edges at the time of the first reception. When the number of teeth is used instead of the number of edges, the number of teeth is within a range of ±12 centered on the number of teeth at the first reception. In this case, as shown in FIG. 6B, when the number of gear edges at the time of second frame reception is within the range of the variation allowable width determined by the first frame reception, the wheel having the number of edges may match with the wheel on which the frame transmission has been performed, and becomes TRUE.

However, also in this case, the variation allowable width is determined around a second reception angle that is the angle of the transmitter 2 at the time of the second frame reception and is a value corresponding to 180° centered on the second reception angle. For this reason, a portion where the 180° variation allowable width centered on the first reception angle that is the previous variation allowable width and the 180° variation allowable width centered on the second reception angle becomes a new variation allowable width, and the new variation allowable width can be narrowed to the overlapping range. When the number of edges is used, the number of edge range of 12 to 48 is the variation allowable width.

Figure 6C:
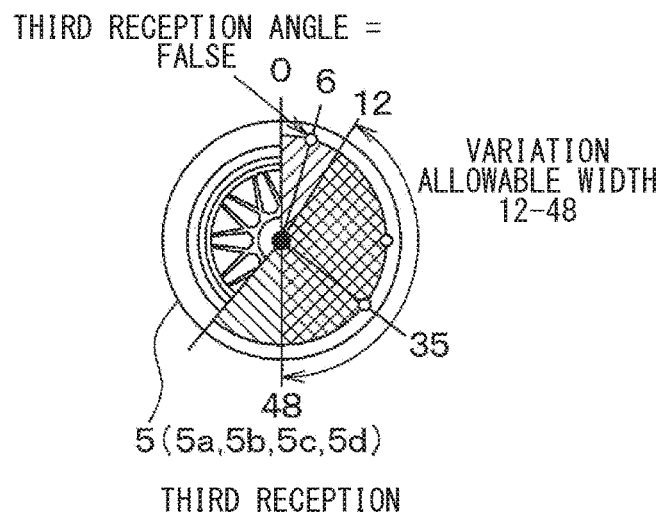
FIG. 6C is a schematic view illustrating a specification logic for the wheel position.

Therefore, as shown in FIG. 6C, when the number of gear edges at the time of third frame reception is within the range of the variation allowable width determined by the first and second frame reception, the wheel having the number of edges does not match with the wheel on which the frame transmission has been performed, and becomes FALSE. At this time, even if the number of gear edges is within the range of the variation allowable width determined by the first frame reception, it is determined as FALSE when being outside the range of the variation allowable width determined by the first and second frame reception In this way, it is possible to specify which of the traveling wheels 5a to 5d the transmitter 2 having transmitted the received frame is attached to.

That is, as shown in FIG. 7A, for a frame including ID1 as ID information, the number of gear edges is acquired at each frame reception timing and stored for each of the corresponding traveling wheels 5a to 5d. Here, the traveling wheels 5a to 5d are respectively represented by a left front wheel FL, a right front wheel FR, a left rear wheel RL, and a right rear wheel RR. Then, each time a frame is received, it is determined whether the number of gear edges acquired is within the range of the variation allowable width, and a wheel out of the range is removed from wheel candidates each attached with the transmitter 2 to which the frame has been transmitted. Then, wheels that are not removed until the end are registered as the wheels each attached with the transmitter 2 to which the frame has been transmitted. In the case of the frame including ID1, the right front wheel FR, the right rear wheel RR, and the left rear wheel RL are removed from the candidates in this order, and the left front wheel FL finally left is registered in association with ID information, as the wheel attached with the transmitter 2 to which the frame has been transmitted.

Then, as shown in FIGS. 7B to 7D, the same processing as that for the frame including ID1 is performed for the frames including ID2 to ID4 as ID information. Hence it is possible to specify the wheel attached with the transmitter 2 to which each frame has been transmitted, and it is possible to specify all four wheels to each of which the transmitter 2 is attached.

In this way, which of the traveling wheels 5a to 5d the transmitter 2 having transmitted each frame is attached to, that is, the wheel position is specified. When the specification of the wheel position is completed and the ID information of the transmitter 2 attached to each of the four traveling wheels 5a to 5d is determined, an affirmative determination is made in step S115. Thus, the processing proceeds to step S120 and the ID registration is performed. That is, the microcomputer 33 stores the ID information of each transmitter 2 having transmitted the frame in association with the position of the wheel to which the transmitter 2 is attached, and registers the four pieces of ID information as one wheel set.

Next, as the flow for performing ID registration by the second method, the processing of performing the ID registration on the basis of the registered wheel set will be described.

The ID registration by the second method is performed by performing the processing after step S125 in FIG. 4.

First, target set selection processing is performed in steps S125 to S135. Specifically, in step S125, it is determined whether a frame including ID information registered in the past has been received. When an affirmative determination is made here, the processing proceeds to step S130, and the processing of step S125 is repeated until a predetermined set time has elapsed. Then, when the set time has elapsed, the processing proceeds to step S135 to select the target set. That is, a wheel set including ID information registered in the past received during the set time is selected as the target set.

When the frame including ID information registered in the past is received, the frame can be immediately used as the candidate set. However, there is a possibility that a wheel set different from the wheel set attached to the vehicle 1 by tire replacement may be stored near the vehicle 1, and the frame transmitted from the transmitter 2 provided on the wheel of the wheel set may be have been received. For this reason, the processing waits for a predetermined time, and a wheel set including ID information registered in the past received during that period is selected as the target set.

Then, the processing proceeds to step S140, and it is determined whether there is multiple target sets. When a negative determination is made here, that is, when there is only one target set, the processing proceeds to step S145, and the target set is determined as the candidate set.

When an affirmative determination is made in step S140, the processing proceeds to step S150 to select the candidate set from multiple target sets, and it is determined whether a frame including ID information registered in the past has been received even when the vehicle 1 is in the traveling state. When the frame including ID information registered in the past is received during the traveling, the processing proceeds to step S145. Thereby, in step S145, the target set including ID information received also when the vehicle 1 is in the traveling state is determined as the candidate set from the target sets.

When a negative determination is made in step S150, there is no wheel set that can be the candidate set although there is multiple target sets. In this case, there is a high possibility that the tire has been replaced with a wheel set different from the wheel set registered in the past. For this reason, in this case, processing passes through the flow of ID registration by the second method and proceeds to step S110, where only the ID registration flow by the first method is performed.

Further, when the candidate set is determined, the processing proceeds to step S155, and it is determined whether frames including four pieces of ID information included in the candidate set have been received. When an affirmative determination is made here, the processing proceeds to step S120, where the ID registration is performed. At this time, the microcomputer 33 registers the ID information of the four transmitters 2 having transmitted the frames as the current wheel set.

When an affirmative determination is not made even after a predetermined time has elapsed in step S155, the processing is put into time-out so that the ID registration by the second method is not performed. In this case, the ID registration cannot be performed quickly, but the ID registration is performed by the first method because the ID registration by the first method has been performed in parallel. Further, even when the start switch is turned off with the vehicle 1 not traveling while an affirmative determination is not made in step S155, the processing of step S155 is prevented from entering an infinite loop by the withdrawal.

As described above, the ID registration processing is terminated. An example of an assumed case of such ID registration processing includes a case as shown in FIG. 8.

As shown in FIG. 8, it is conceivable to replace tires between a first set being a wheel set of four pieces of ID information ID1 to ID4 for summer tires used from spring to autumn and a second set being a wheel set of four pieces of ID information ID5 to ID8 for winter tires used in winter. The pieces of ID information ID1 to ID4 of the first set are assumed to be a wheel set that is ID-registered during the initial ID registration processing. Further, the pieces of ID information ID5 to ID8 of the second set are assumed to be a wheel set that is ID-registered during the ID registration processing at the time of tire replacement in winter. When the ID information of each of these two wheel sets is registered, the ID registration by the second method is performed.

For example, when the tires are replaced from the winter tires to the summer tires, the second set of winter tires that will be a pre-replacement set are removed from the registered wheel sets, and the remaining summer tires of the first set will be selected as the target set. Also, since there is only one target set without any other set, the first set is determined as the candidate set as it is, and the four pieces of ID information ID1 to ID4 included in the first set is collated with pieces of ID information included in the received frame. When all the pieces of ID information ID1 to ID4 are received, the pieces of ID information ID1 to ID4 of the candidate set are newly registered as the pieces of ID information of the transmitters 2 attached to the current four traveling wheels 5a to 5d.

Further, when the next winter comes and the tires are replaced from the summer tires to the winter tires, the same operation as described above is performed. That is, the second set of the winter tires is determined as the candidate set, and the pieces of ID information ID5 to ID8 of the candidate set are newly registered as the pieces of ID information of the transmitters 2 attached to the current four traveling wheels 5a to 5d.

In this way, even when the vehicle 1 is not traveling, by receiving the frames including the four pieces of ID information included in the candidate set, the pieces of ID information of the transmitters 2 attached to the current four traveling wheels 5a to 5d can be registered. Therefore, it is possible to perform the ID registration earlier, and it is not necessary to perform the registration by using a tool each time the tires are replaced.

The ID registration processing is performed the method as above. When the ID registration processing is performed, tire pressure detection is then performed.

Specifically, at the time of the tire pressure detection, the frame is transmitted from each transmitter 2 in each predetermined periodic transmission cycle, so that the frames from the transmitters 2 attached to the four traveling wheels 5a to 5d are received by TPMS-ECU 3. Then, when the microcomputer 33 is still in a stage where only the ID registration by the second method has been performed, the microcomputer 33 detects the tire pressure of each of the four traveling wheels 5a to 5d from the information on the tire pressure stored in the frame without specifying the wheel position. When a decrease in tire pressure is detected, the decrease is notified to the meter 4, and it is displayed through the meter 4 that the tire pressure has decreased at any of the traveling wheels 5a to 5d.

When the specification of the wheel position is also performed by the first method, on the basis of the ID information stored in each frame, the microcomputer 33 specify which of the traveling wheels 5a to 5d the transmitter 2, from which the frame has been transmitted, is attached. Then, the tire pressure of each of the traveling wheels 5a to 5d is detected from the information on the tire pressure stored in the frame. As a result, it is possible to detect in which of the traveling wheels 5a to 5d the tire pressure has decreased while specifying the wheel position. When a decrease in tire pressure is detected, the decrease is notified to the meter 4 so that the meter 4 displays specifying in which of the traveling wheels 5a to 5d the tire pressure has decreased.

When the specification of the wheel position by the first method is completed early, it may be faster than the ID registration by the second method. In that case, the ID information for which the wheel position has been specified by the first method may be registered. In other words, the ID registration may be performed on the basis of the first method or the second method which is completed earlier. In addition, when both the first method and the second method are completed regardless of which is completed earlier it is preferable that the ID registration be performed with priority given to the ID information for which the wheel position has been specified by the first method.

As described above, the ID registration by the second method is performed when the registration switch 40 is pressed. That is, the candidate set is determined not from the pre-replacement set ID-registered at a stage before tire replacement, but from the wheel sets ID-registered in the past which is prior to a stage before the tire replacement When all the frames including the four pieces of ID information included in the candidate set are received, the four pieces of ID information are newly registered as ID information of the transmitters 2 attached to the current four traveling wheels 5a to 5d.

In such ID registration by the second method, the wheel position cannot be specified, but a new ID can be registered without traveling the vehicle 1. Hence the ID information of the transmitters 2 attached to the traveling wheels 5a to 5d of the subject vehicle can be registered earlier.

Modification of First Embodiment

Figure 9:
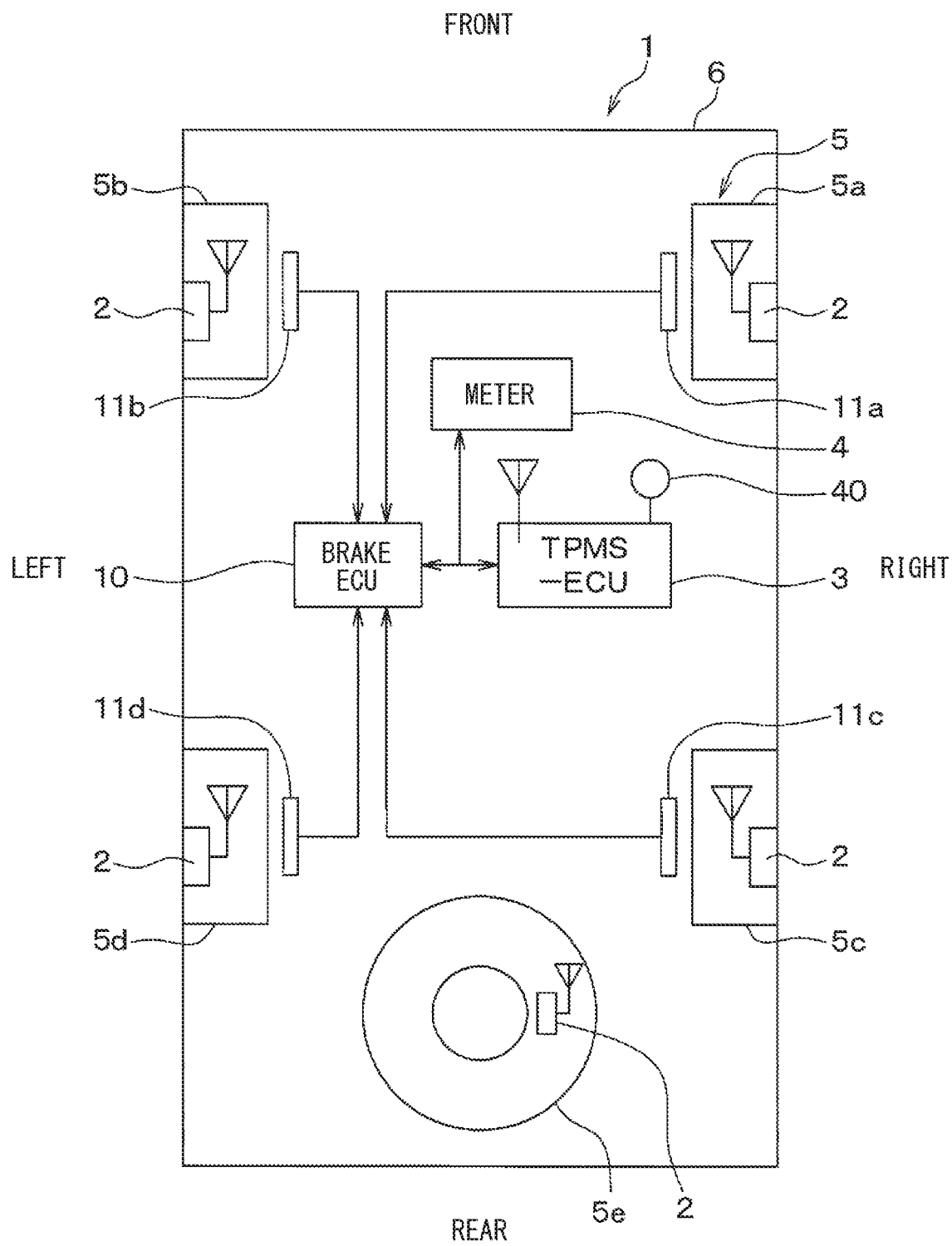
FIG. 9 is a block diagram showing an overall configuration of a tire pressure detection apparatus to which a wheel registration apparatus according to a modification of the first embodiment is applied.

In the above embodiment, the ID registration for the vehicle 1 having the four traveling wheels 5a to 5d has been described. However, as shown in FIG. 9, the transmitter 2 may also be attached to a spare wheel 5e. In that case, at the time of the ID registration, the following handling is possible.

For example, as shown in FIG. 10, the pieces of ID information ID1 to ID4 of the transmitters 2 attached to the four traveling wheels 5a to 5d of the summer tires used from spring to autumn and ID information ID9 of the transmitter 2 attached to the spare wheel 5e are set as the first set. Further, the pieces of ID information ID5 to ID8 of the transmitters 2 attached to the four traveling wheels 5a to 5d of the winter tires used in winter and ID information ID9 of the transmitter 2 attached to the spare wheel 5e are set as the second set. In general, even when the tire replacement is performed, the spare wheel 5e is not replaced, so the ID information ID9 of the transmitter 2 attached to the spare wheel 5e remains unchanged.

In such a case, the ID information ID9 is common in the first set and the second set. Therefore, in steps 125 to S135 in FIG. 4, at the time of selecting, as the target set, a wheel set from which the ID information registered in the past has been received, the target set is selected using the remaining pieces of ID information except for the remaining ID information ID9 that is common in multiple wheel sets. In this way, it is possible to prevent multiple wheel sets from being selected as the target set on the basis of one piece of ID information ID9.

Second Embodiment

A second embodiment of the present disclosure will be described. The present embodiment is configured to cope with a case where only some of the wheels is replaced with respect to the first embodiment, and the others are the same as the first embodiment, so that only portions different from the first embodiment will be described.

As shown in FIG. 11, a case as follows or the like is assumed: after the four pieces of ID information ID1 to ID4 for the summer tires are registered as the first set and the four pieces of ID information ID5 to ID8 for the winter tires are registered as the second set, the winter tires are replaced with the summer tires, and only one tire is further replaced. In such a case, when the registration switch 40 is pressed as the ID registration by the second method, even when a wheel set different from the pre-replacement set is determined as the candidate set, appropriate ID registration is not performed.

Figure 12A:
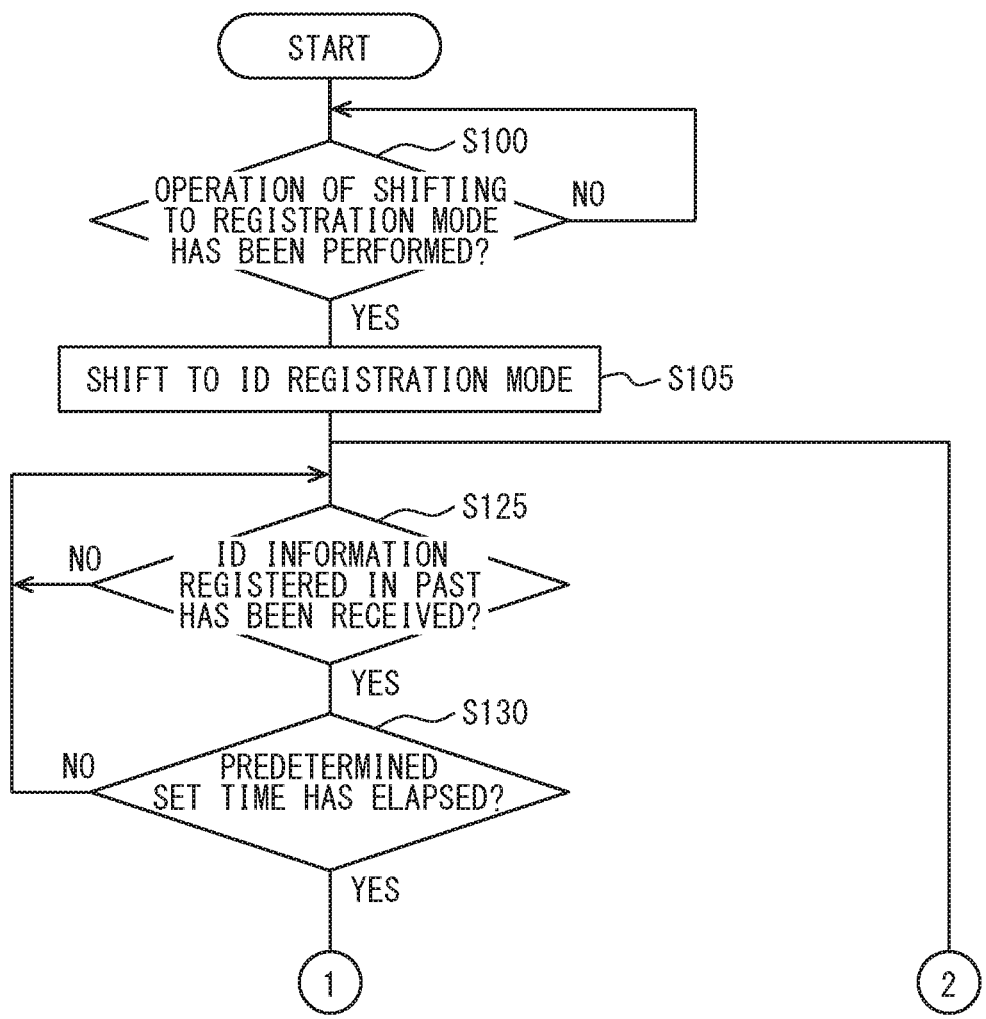
FIG. 12A is a flowchart showing a detail of an ID registration processing.
Figure 12B:
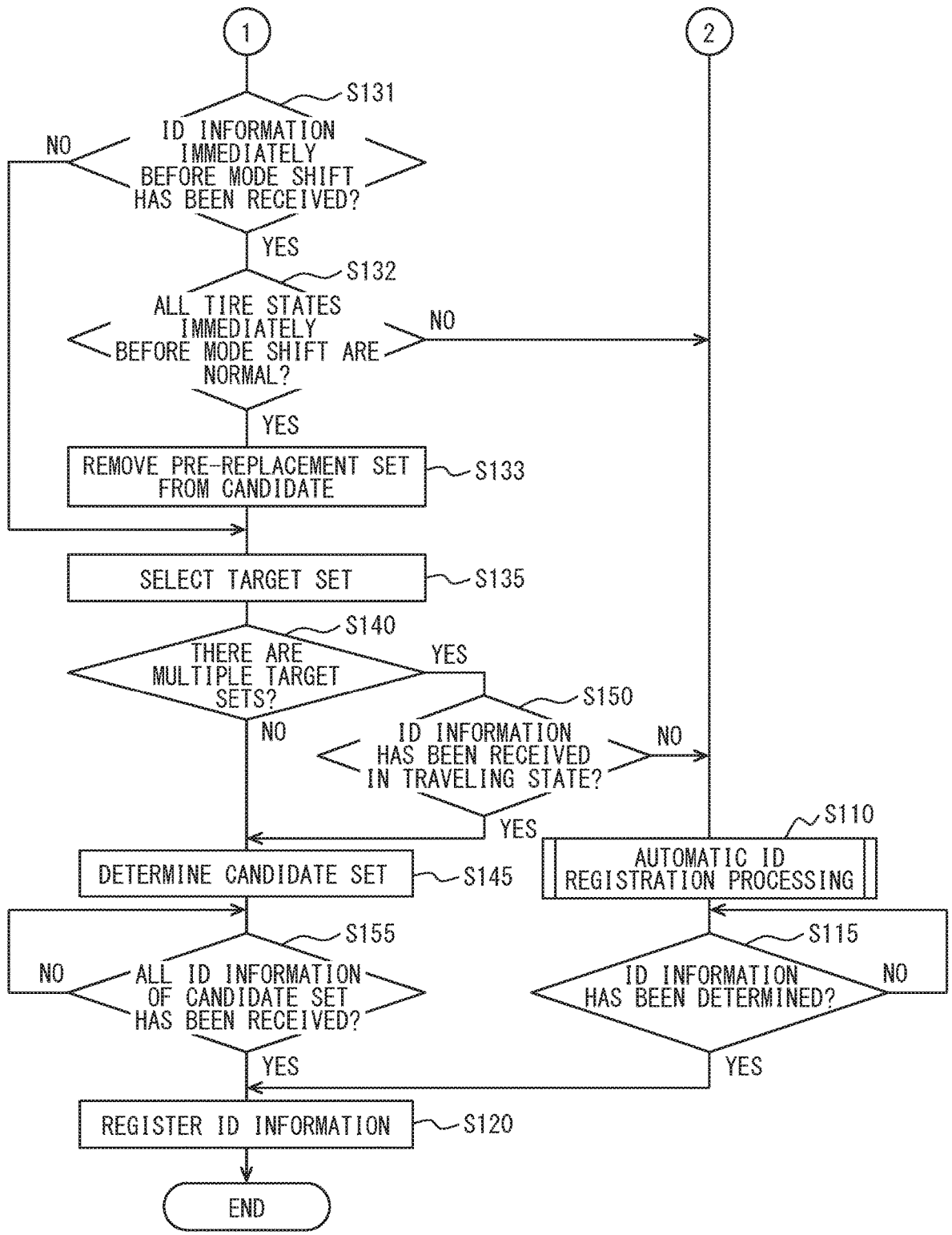
FIG. 12B is a flowchart showing a detail of the ID registration processing following FIG. 12A.

Therefore, in the present embodiment, the microcomputer 33 executes ID registration processing shown in FIGS. 12A and 12B, to make it possible to cope with the case where the tire replacement is performed only for some of the wheels as shown in FIG. 11. Note that the ID registration processing shown in FIGS. 12A and 12B is obtained by adding the processing of steps S131 to S133 to the ID registration processing shown in FIG. 4 described in the first embodiment, and the processing in each of the other steps is the same.

First, the microcomputer 33 executes the processing of steps S100 to S130 and then proceeds to step S131. Then, in steps S131 to S133, the processing of preventing the ID registration by the second method from being performed when only some of the wheels are subjected to the tire replacement.

Specifically, in step S131, it is determined whether at least one piece of ID information immediately before the shift to the registration mode, that is, the ID information of the pre-replacement set has been received. When the ID information of the pre-replacement set has not been received after the shift to the registration mode, the pre-replacement set is no longer in the vicinity of the vehicle 1. In this case, it is considered that tire replacement of all the traveling wheels 5a to 5d has been performed. Therefore, when a negative determination is made here, the processing proceeds to step S135 without performing the processing in steps S132 and S133, and the same processing as in the first embodiment is performed.

On the other hand, when an affirmative determination is made in step S131, that is, when at least one piece of ID information of the pre-replacement set is received, there is a possibility that the tire replacement has been performed only for some of the traveling wheels 5a to 5d are replaced with a tire. Therefore, the processing proceeds to step S132, and it is determined whether the tire state is normal on the basis of the frame including the ID information immediately before the mode shift.

The tire state here means the tire pressure or the state of the transmitter 2. That the tire pressure is normal means that, for example, the tire pressure indicated by data on the tire pressure stored in the frame is not zero. Further, that the state of the transmitter 2 is normal means that the pressure sensor 21a, the temperature sensor 21b, or the like is not abnormal, and further means that the frame from the transmitter 2 can be received normally, and the like.

The situation in which the tire replacement is performed only for some of the traveling wheels 5a to 5d is considered to be a failure of the transmitter 2, a tire puncture, and the like. The failure of the transmitter 2 is considered to be a case where the frame from the transmitter 2 cannot be received by the TPMS-ECU 3, a case where a failure of the sensor in the transmitter 2, that is, a failure of the pressure sensor 21a, the temperature sensor 21b, or the like, has occurred, or some other case. Further, when a puncture that requires the tire replacement occurs, the tire pressure becomes equal to or less than a threshold, for example, 0. That is, it can be determined that the tire pressure is normal when exceeding the threshold, and the tire pressure is not normal when being equal to or less than the threshold. Therefore, assuming these situations, it is determined in step S132 whether the tire pressure and the state of the transmitter 2 are normal. Here, it is determined whether both the tire pressure and the state of the transmitter 2 are normal, but at least one of these may be determined.

Here, when a negative determination is made, there is a possibility that the tire replacement has been performed on only some of the traveling wheels 5a to 5d, so that the processing proceeds to step S110 to prevent the candidate set from being determined, that is the ID registration by the second method from being performed.

When an affirmative determination is made here, the tire replacement has not been performed only for some of the traveling wheels 5a to 5d, and thus the processing proceeds to step S133. In step S133, the pre-replacement set that is the wheel set before the shift to the registration mode is removed from the target set. Thereafter, the processing proceeds to step S135, and the ID registration is performed by performing the same processing as in the first embodiment.

As described above, in the present embodiment, when the tire replacement is performed only for some of the traveling wheels 5a to 5d, the ID registration by the second method is not performed, and the ID registration by the first method is performed. As a result, even if the registration switch 40 is pressed when the tire replacement is performed only for some of the traveling wheels 5a to 5d, it is possible to prevent erroneous ID registration of a different wheel set. For example, as shown in FIG. 11, it is assumed that among the tires of the traveling wheels 5a to 5d, the wheel to which the transmitter 2 with the ID information ID4 is attached is replaced with the wheel to which the transmitter 2 with the ID information ID10 is attached. In that case, since the ID registration by the first method is performed, a wheel set of the pieces of ID information ID1 to ID3 and ID10 are newly registered as a third set. As described above, even when the tire replacement is performed only for some of the traveling wheels 5a to 5d, the wheel set including the four pieces of ID information ID1 to ID3 and ID10 can be registered again.

Third Embodiment

A third embodiment of the present disclosure will be described. The present embodiment is configured to set the number of sets that can be registered with respect to the first and second embodiments, and the others are the same as the first and second embodiments, so that only portions different from the first and second embodiments will be described.

In the first and second embodiments, when the wheel set is changed by the tire replacement, a new wheel set is registered each time. However, considering the reduction in memory capacity, only a predetermined number of sets are preferably registered instead of wheel sets being registered without limitation. Therefore, in the present embodiment, the number of sets that can be registered in the memory by the microcomputer 33 is limited to a predetermined number of sets obtained by combining of sets including the current wheel set currently attached to the vehicle 1 and multiple past sets registered in the past. Hereinafter, a case where five pieces of ID information of the traveling wheels 5a to 5d and the spare wheel 5e are registered as ID information of each wheel set will be described as an example.

Figure 13:
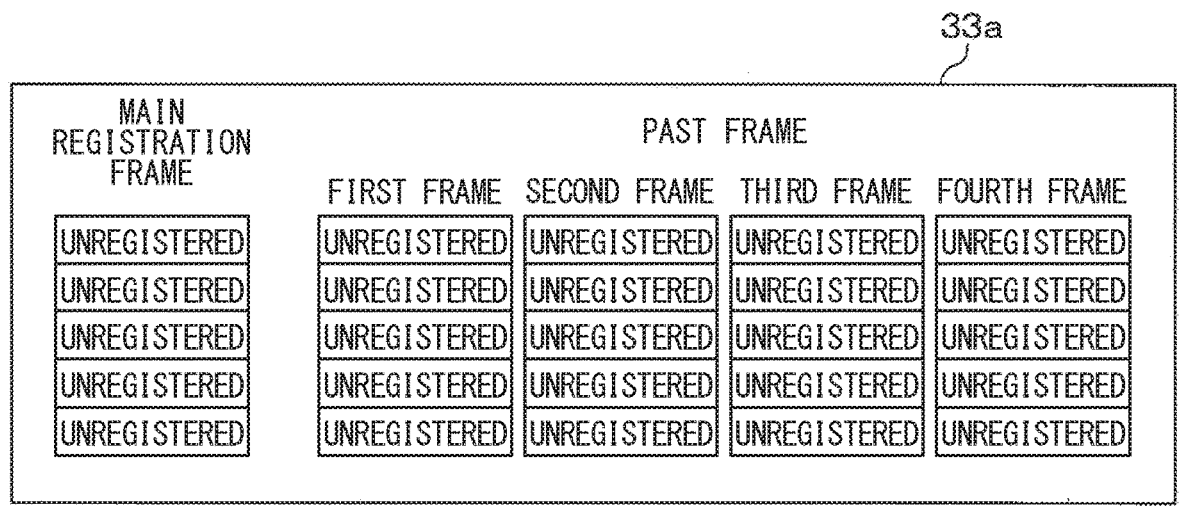
FIG. 13 is a diagram showing an example of a memory configuration of a microcomputer described in a third embodiment.

For example, as shown in FIG. 13, the number of sets that can be registered in a memory 33a built in the microcomputer 33 is five. Then, with the first one taken as the main registration frame, five pieces of ID information of the traveling wheels 5a to 5d and the spare wheels 5e currently attached to the vehicle 1 are registered, and with the remaining four taken as a past frame, previously registered wheel sets are registered. There are a first frame to a fourth frame for the past frame, and in the past frame, the first frame is the newest data, and the fourth frame is the oldest data. The frame where data is registered has been set so that the pieces of data are arranged in chronological order from the first frame to the fourth frame. When the number of sets to be registered is exceeded, the oldest data is deleted.

In the case of such a configuration, in a state where the first wheel set is registered and no other wheel set is registered, for example, when the vehicle 1 is shipped from a vehicle factory, as shown in FIG. 14A, the wheel set with five pieces of ID information are registered in the main registration frame. At this time, pieces of ID information on other wheel sets are not yet registered in the past frame.

Subsequently, when the tire replacement is performed, five pieces of ID information of the second wheel set are registered. At this time, as shown in FIG. 14B, the five pieces of ID information of the first wheel set registered in the main registration frame are moved to the first frame of the past frame and five pieces of ID information of the newly replaced traveling wheels 5a to 5d and spare wheels 5e are registered in the main registration frame.

In general, the tire replacement is not performed for the spare wheel 5e, but as shown in FIG. 14C, the tire replacement may also be performed for the spare wheel 5e, and the ID information of the spare wheel 5e is also changed from ID5 to IDE.

As thus described, by registering pieces of ID information of multiple wheel sets divided into the main registration frame and the past frame, the microcomputer 33 recognizes the wheel set registered in the main registration frame as a pre-replacement set, the target set can be selected from the past frame.

Figure 14D:
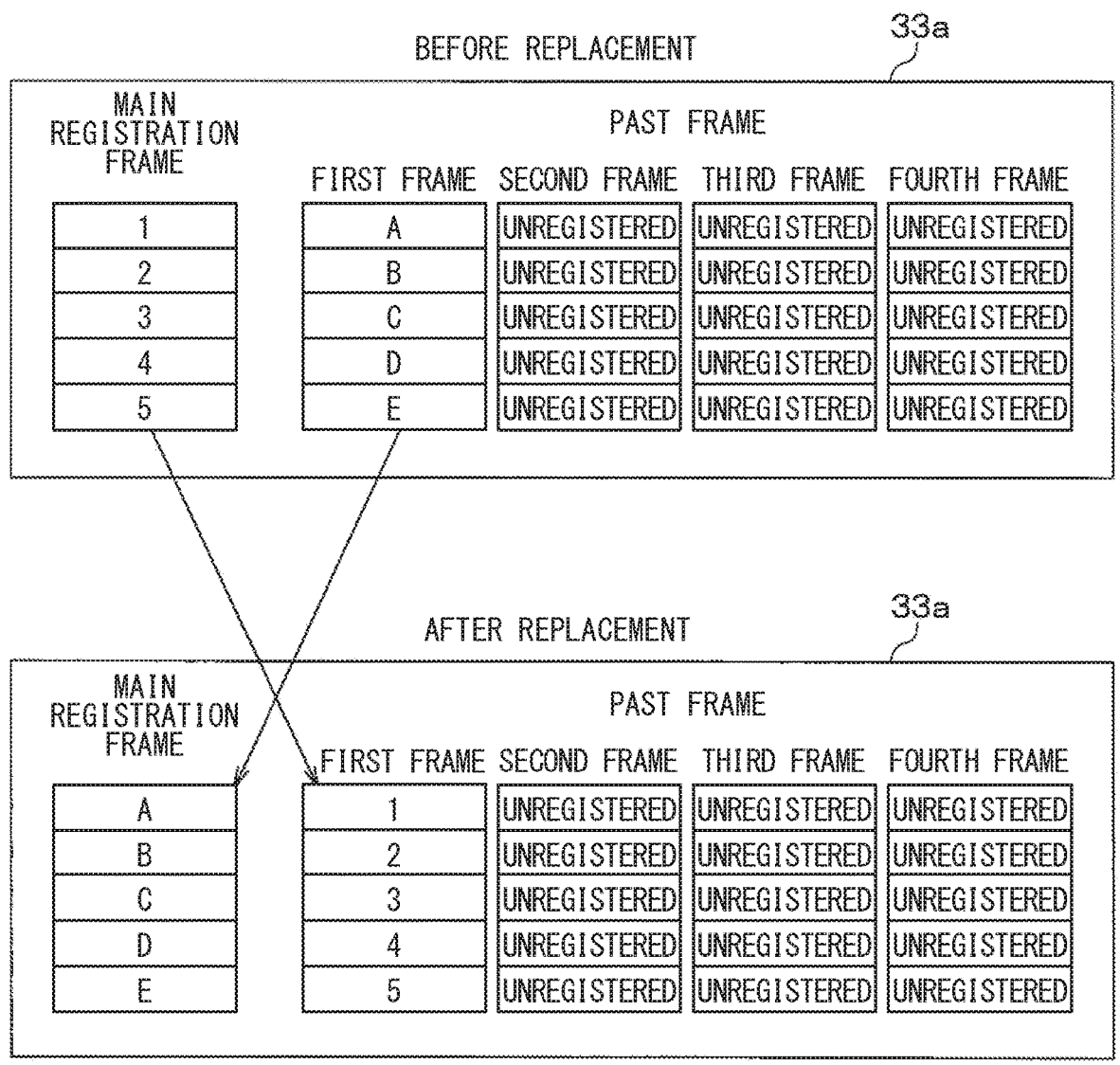
FIG. 14D is a diagram showing an example of a memory configuration before and after tire replacement.

Next, in a state where pieces of ID information of different wheel sets are registered in the main registration frame and the first frame of the past frame, respectively, it is assumed that the tire replacement is performed, tires are replaced and returned to the wheel set in the first frame of the past frame. For example, as shown in FIG. 14D, it is assumed that ID1 to ID5 are registered in the main registration frame and IDA to IDE are registered in the first frame of the past frame before the tire replacement. In that case, after the tire replacement, the five pieces of ID information of the traveling wheels 5a to 5d and the spare wheel 5e attached to the vehicle 1 after the replacement become IDA to IDE and are moved to the main registration frame. Then, ID1 to ID5 which are the pre-replacement set are moved to the first frame of the past frame.

In this way, when the ID information after the tire replacement is for that of a wheel set having already been registered, the ID information can be prevented from being redundantly registered in the past frame by being moved to the main registration frame. This can eliminate a waste of memory capacity.

Figure 14E:
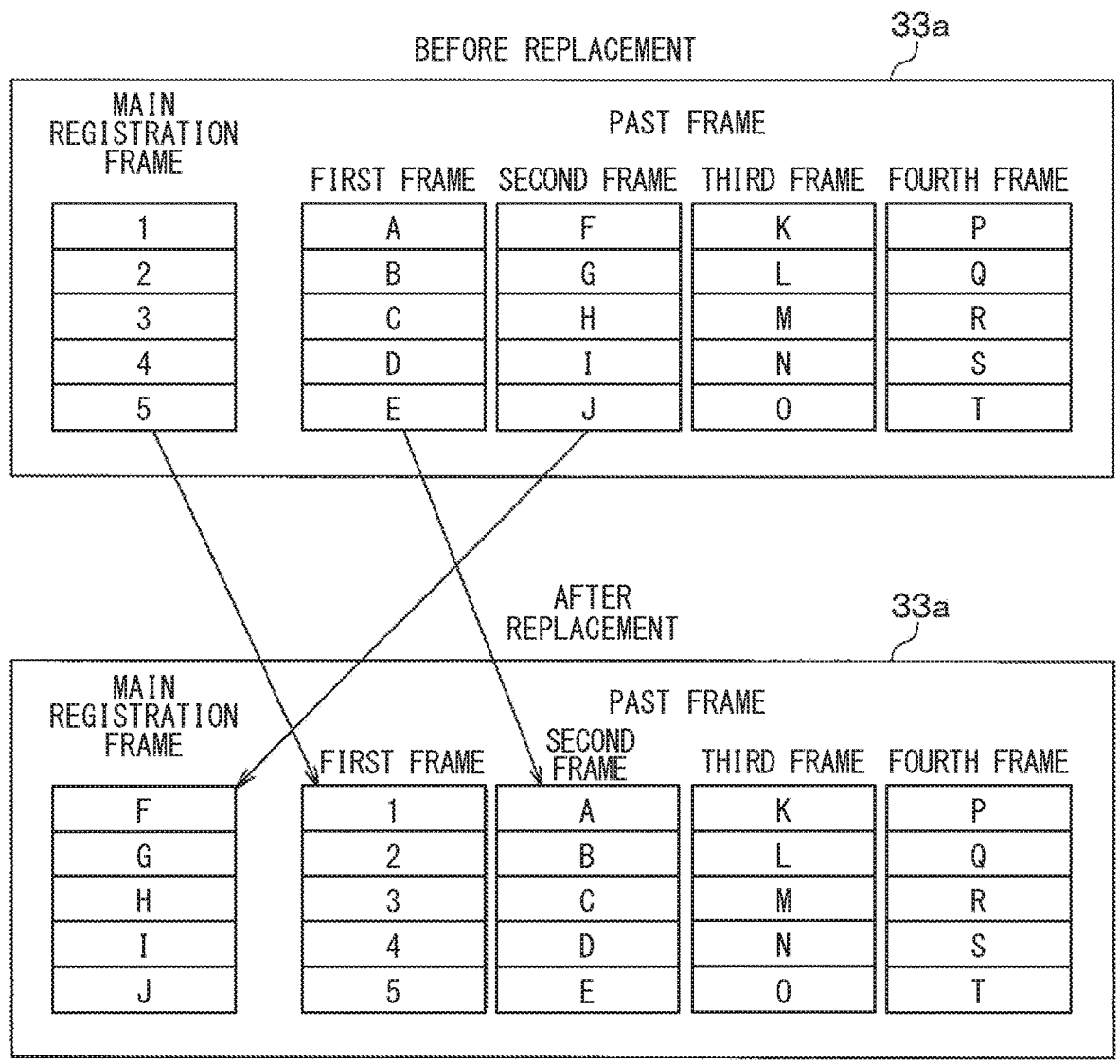
FIG. 14E is a diagram showing an example of a memory configuration before and after the tire replacement.

Further, in a case where pieces of ID information of multiple wheel sets are registered in the past frame, it is assumed that the five pieces of ID information of the traveling wheels 5a to 5d and the spare wheel 5e attached to the vehicle 1 after the tire replacement are ID information of the wheel set registered in one frame in the past frame. Also, in that case, as shown in FIG. 14E, the five pieces of ID information of the traveling wheels 5a to 5d and the spare wheels 5e attached to the vehicle 1 after the tire replacement are moved to the main registration frame. Then, the pieces of ID information of the wheel set moved to the main registration frame is removed, and the pieces of ID information of the remaining wheel sets are registered in reverse chronological order from the first frame to the fourth frame.

The example of FIG. 14E shows a case where the traveling wheels 5a to 5d and the spare wheel 5e have been replaced with the wheel set in the second frame by tire replacement. In this case, the pieces of ID information of the wheel set that was the second frame are moved to the main registration frame, the pieces of ID information of the wheel set that was the main registration frame are moved to the first frame, and the pieces of ID information of the wheel set that was the first frame are moved to the second frame.

In the second embodiment, the example has been illustrated where, when a part of the wheel set is replaced due to a failure or the like, the wheel set before replacement and the wheel set after replacement are registered as different sets In contrast, since the pre-replacement set including ID information replaced due to a failure is unlikely to be used in the future, only the wheel set after replacement may be registered in the memory, and the pre-replacement set may be deleted.

For example, as shown in FIG. 14F, it is assumed that IDA to IDE are registered in the main registration frame as the pre-replacement set. In this case, when the ID information of the wheel set to be registered is IDA, IDB, IDE, IDF, ID5, it is not necessary to keep the wheel set of IDA to IDD, ID5 currently registered in the main registration frame. Therefore, for the four pieces of ID information of the traveling wheels 5a to 5d, the ID information of the wheel set scheduled to be registered is compared with the ID information already registered in the main registration frame or the past frame. When no piece of ID information of the traveling wheels 5a to 5d is common, the ID information is registered as a new wheel set. On the other hand, when one to three pieces of ID information of the traveling wheels 5a to 5d are common and the remainder are different, it is assumed that only a part of the wheel set has been subjected to the tire replacement. For this reason, as shown in FIG. 14F, IDA, IDB, IDE, IDF, and ID5, which are the ID information of the wheel set to be registered, are registered in the main registration frame, and the ID information of the pre-replacement set is deleted. In this way, it is possible to prevent a waste of memory due to registering a wheel set unlikely to be used. Naturally, the same can be done for a case where in the wheel set registered in the past frame, a part of the ID information of the traveling wheels 5a to 5d is common and the remainder is different, thus making it possible to prevent a waste of memory.

Conversely, as in the second embodiment, even when a part of the wheel set is replaced, the wheel set before the replacement and the wheel set after the replacement can be registered as different sets. Even in such a case, it is possible to prevent multiple wheel sets from being selected as the target sets on the basis of the overlapping ID information by the method of the modification of the first embodiment.

For example, when some wheels of the wheel sets in the past frame are replaced, a wheel set having overlapping ID information comes into a registered state. In the example of FIG. 14G, for the wheel sets in the first frame and the third frame, IDA to IDC overlap, and IDD and IDE in the first frame and ID6 and ID7 in the third frame are registered as different ID information. In this case, even when the TPMS-ECU 3 receives any pieces of ID information IDA to IDC at the time of tire replacement, IDA to IDC are common among multiple wheel sets, and hence the target set is not selected at this stage. Then, the target set is selected for the first time when non-overlapping ID information is received.

In this way, when a part of the wheel set is replaced, even if the wheel set before replacement and the wheel set after replacement are registered as different sets, it is possible to appropriately select the target set.

There is also a possibility that after a part of the wheel set is replaced and the ID information of the replaced wheel set is registered, the replaced part may be restored again. In such a case, as described here, it is effective to register the wheel set before replacement and the wheel set after replacement as different sets.

Fourth Embodiment

A fourth embodiment of the present disclosure will be described. The present embodiment is configured to enable switching of the number of pieces of ID information registered as a wheel set with respect to the first to third embodiments, and the others are the same as the first embodiment, so that only portions different from the first and third embodiments will be described.

In the first and second embodiments described above, when four pieces of ID information of the traveling wheels 5a to 5d are registered, in the modification of the first embodiment and the third embodiment, the case has been described as an example where five pieces of ID information of the traveling wheels 5*a* to 5*d* and the spare wheels 5*e* are registered. These registration numbers can be made switchable. For example, the registration number can be set by instructing the microcomputer 33 by use of a tool or through an input switch (not shown).

When the registration number is switchable in this way, at the time of tire replacement or the like, although the registration number is originally 4, the registration number may be erroneously switched to 5 or vice versa In that case, the number of pieces of ID information registered after the switching is different from the number of pieces of ID information to be actually registered. Thus, at the time of determining the candidate set, a wheel set having a different number of pieces of registered ID information compared to the number of pieces of registered ID information currently registered in the main registration frame is not selected.

Figure 15A:
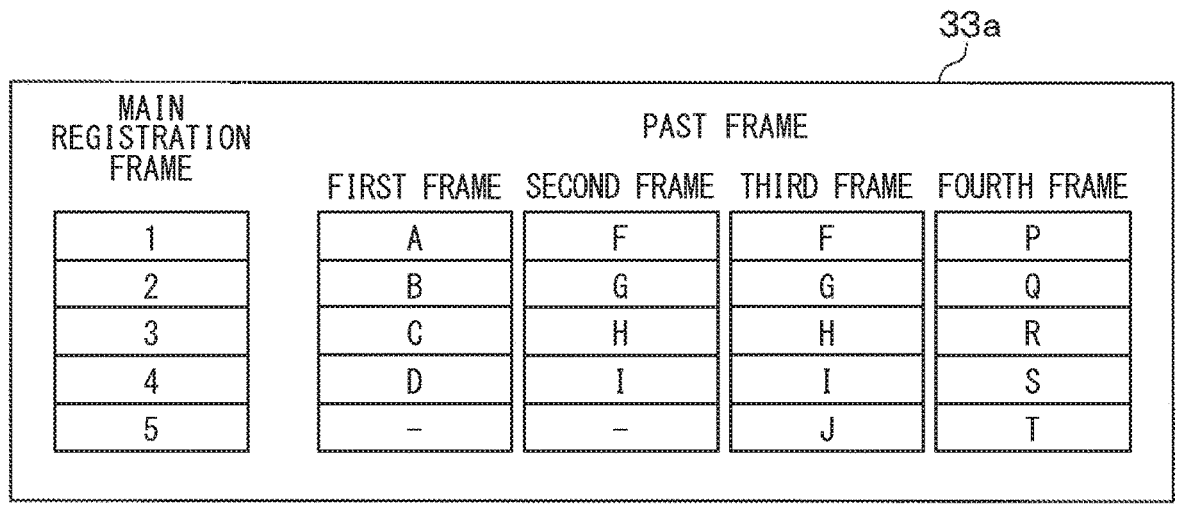
FIG. 15A is a diagram showing an example of a memory configuration when the number of pieces of registered ID information for each wheel set is switched.

Specifically, as shown in FIG. 15A, a case is assumed where, when the registration number is erroneously switched to four although the original registration number is 5, four wheel sets are registered in the past frame. In this case, only the wheel set in the frame having the same registration number as that of the wheel set currently registered in the main registration frame is selected as the target set, and the wheel sets having a different registration number is not set as the target set. That is, in the example of FIG. 15A, the registration number in the first frame and the second frame is four, which is different from the registration number in the main registration frame, so that only wheel sets with a registration number of 5 can be the target set as in the third frame and the fourth frame.

In this way, when the registration number is switchable, only the wheel set in the frame having the registration number corresponding to the registration number of the main registration frame can be the target set, and the wheel set in the frame having a different registration number will not be the target set. This makes it possible to prevent erroneous registration of ID registration.

Figure 15B:
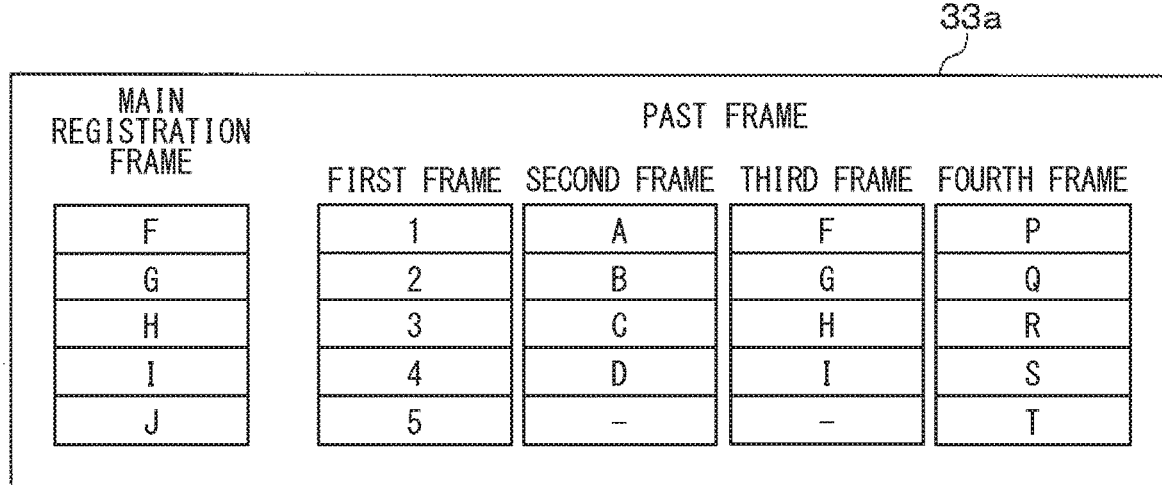
FIG. 15B is a diagram showing an example of a memory configuration when the number of pieces of registered ID information for each wheel set is switched.

In this case, for example, when the tire replacement is performed for the wheel set in the third frame, and as shown in FIG. 15B, when five pieces of ID information of IDF to IDJ are registered in the main registration frame after the tire replacement, ID1 to ID5 registered in the main registration frame are moved to the first frame before the replacement. Then, the pieces of ID information having a registration number of four wheel sets registered in the first frame and the second frame are moved to the second frame and the third frame, respectively. In this way, it is possible to register the ID information of the wheel set having the same registration number.

In the example of FIG. 15B, the pieces of ID information of the wheel sets having a registration number of 4 are left as it is, but those having a registration number of 4 may be deleted at the time of tire replacement, and only the pieces of ID information of the wheel sets having the same registration number as that of the main registration frame may be left.

Other Embodiments

Although the present disclosure has been described on the basis of the embodiments described above, the present disclosure is not limited to the embodiments but also includes various modifications and modifications within an equivalent range. In addition, various combinations and forms, as well as other combinations and forms including only one element, more than that, or smaller than that, are also within the scope and idea of the present disclosure.

For example, in the above embodiment, in steps S125 to S135 in FIG. 4, in the case of there being multiple target sets, when a frame including ID information registered in the past is received even in the traveling state, the target set including the ID information is determined as the candidate set. After the candidate set is determined, when four pieces of ID information included in the candidate set are received, the ID registration is performed. In contrast, even if the vehicle 1 does not come into the traveling state, when only one of multiple target sets has received all four pieces of ID information during a certain period, the four pieces of ID information included in the target set may be registered as they are. The certain period may be set to a time longer than a period in which data is certainly transmitted from each transmitter 2 at least once.

In this way, the candidate set is not made unless four pieces of ID information are available, so that it is possible to prevent the wheel set where ID information has accidentally arrived from being erroneously registered as the candidate set even though the wheel has not actually been replaced. In such a case, when the candidate set is determined, since all pieces of ID information of the wheel set of the candidate set is already available, the ID information is immediately registered as the ID information of the wheel set currently attached to the vehicle 1.

On the other hand, even if only one of multiple target sets has received all four pieces of ID information during a certain period, when ID information of another target set has also been received, it is also possible to shift the registration by the second method to the registration by the first method because the candidate sets cannot be narrowed down to one.

For example, as shown in FIG. 16A, a case is assumed where ID1 to ID5 are registered in the main registration frame, and the pieces of ID information of the past wheel sets are registered in the first frame to the fourth frame of the past frames, respectively. In this case, when the tire replacement is performed, the wheel sets in the first frame to the fourth frame of the past frame can be the target set. Among the wheel sets, as shown in FIG. 16B, even when all IDA to IDE serving as ID information of the wheel set in the first frame are prepared, there is a possibility that the wheel set in another frame may be received. For this reason, the wheel set in the first frame is not determined as the candidate set, but the candidate set is not determined during a predetermined set time. When a period in which data is certainly transmitted from each transmitter 2 at least once, that is, a period longer than the transmission cycle for ID registration elapses as the set time, the candidate set is determined for the first time.

In this case, if no piece of ID information of the other wheel sets has been received except for the pieces of ID information IDA to IDE of the wheel set in the first frame, the wheel set in the first frame is determined as the candidate set, but the candidate set is not determined when the data has been received as shown in FIG. 16B. In other words, even the wheel set for which the four pieces of ID information were not available during the set time has a possibility to be the wheel set actually attached, so that the candidate sets are not narrowed down to one. Then, the processing shifts to the specification of the wheel position by using the first method instead of using the second method. Also, in this way, it is possible to prevent the wheel set where ID information has accidentally arrived from being erroneously registered as the candidate set even though the wheel has not actually been replaced.

Further, the concept in a case where the transmitter 2 is provided at the spare wheel 5e as described in the modification of the first embodiment can also be applied to the second embodiment. It is thereby possible to prevent multiple wheel sets from being selected as the target sets on the basis of the ID information of the transmitter of the spare wheel 5e that is common among the multiple wheel sets.

Further, in the above embodiment, as the method for specifying the wheel positions on the traveling wheels 5a to 5d side mentioned as the first method, the description has been given taking as an example the mode in which the variation allowable width is changed at each frame reception timing so that the variation allowable width is narrowed gradually. However, another method may be used as the method for specifying the wheel positions on the traveling wheels 5a to 5d side. That is, for the second method, the method described in each of the above embodiments is used, but the first method may be different from the method described in each of the above embodiments.

For example, as the first method, the ID information of each transmitter 2 can be registered into the TPMS-ECU 3 for each wheel set by using a tool. In that case, when the registration mode is entered, the candidate set may be determined using the second method from multiple wheel sets that have been ID-registered by using the tool as the first method, to finally perform the ID registration. As described above, in the case of the ID registration by using the tool, it is troublesome for an operator such as a dealer and the user to perform the ID registration again by using the tool each time of the tire replacement. Therefore, when the ID registration is performed as described above, the trouble of the operator such as the dealer and the user can be eliminated.

In the above embodiment, while the first method and the second method are performed in parallel, the first method is performed after the ID registration by the second method is performed, and the wheel position is finally specified by the first method. However, this has only shown an example, and the operation of the ID registration may be terminated when the ID registration by the second method is performed while the first method is not performed. In that case, if necessary, the specification of the wheel position by the first method can be performed independently as a separate flow. By doing so, only the specification of the wheel position can be performed independently, so the wheel position can be specified earlier.

In the above embodiment, in step S150 in FIG. 4, when there is multiple target sets, it is determined whether the frame including the ID information has been received even when the vehicle 1 is in the traveling state. However, this has only shown an example, and when there is multiple target sets, the ID registration by the second method may be stopped and only ID registration by the first method may be performed.

In the above embodiment, as the angle at which the frame transmission is performed, the position at an angle of 0° is taken as the position of the acceleration sensor 22 when located at the upper position around the central axis of each of the traveling wheels 5a to 5d. However, this is merely an example, and any position in the circumferential direction of the wheel may be set to an angle of 0°.

In the above embodiment, the TPMS-ECU 3 acquires gear information from the brake ECU 10. However, since the TPMS-ECU 3 only needs to be able to acquire the number of tooth edges or the number of teeth of the gear as the gear information, the TPMS-ECU 3 may acquire the number of tooth edges or the number of teeth of the gear from another ECU, or by inputting the detection signals of the wheel speed sensors 11a to 11d and using the detection signals. In particular, in the above embodiment, the case where the TPMS-ECU 3 and the brake ECU 10 are configured as separate ECUs has been described, but the TPMS-ECU 3 and the brake ECU 10 may be configured as a single ECU integrated with each other. In that case, the ECU directly inputs the detection signals of the wheel speed sensors 11a to 11d and acquires the number of tooth edges or the number of teeth of the gear from the detection signals. In that case, since the number of tooth edges or the number of teeth of the gear can be constantly acquired, unlike the case where these pieces of information are acquired in each predetermined cycle, the wheel position can be specified on the basis of the gear information exactly at the frame reception timing.

In the above embodiment, the wheel registration apparatus provided in the vehicle 1 equipped with the traveling wheels 5a to 5d and the spare wheel 5e has been described. However, the present disclosure can also be applied to a vehicle having a large number of traveling wheels 5a to 5d.

What is claimed is:

1. A wheel registration apparatus applied to a vehicle in which four traveling wheels provided with tires are attached to a vehicle body, the wheel registration apparatus comprising:
a transmitter that is provided on each of the four traveling wheels and has a first controller configured to create and transmit a frame including unique identification information; and
a receiver that is provided on the vehicle body, receives the frames transmitted by the transmitters provided on the four traveling wheels via a reception antenna in a registration mode, and has a second controller configured to register four pieces of the identification information included in the respective frames as pieces of identification information of the transmitters provided on current four traveling wheels,
wherein:
in the registration mode, the second controller registers the four pieces of the identification information included in the frames transmitted by the transmitters provided on the four traveling wheels as one wheel set, and registers a plurality of the wheel sets in response to that tire replacement is performed;
in response to that the registration mode is entered again after the plurality of the wheel sets are registered, the second controller takes as a pre-replacement set, the wheel set registered when the registration mode is entered and determines a candidate set from the wheel set registered in past and different from the pre-replacement set among the plurality of the wheel sets; and
upon reception of the frames including the four pieces of the identification information included in the candidate set, the second controller registers the four pieces of the identification information included in the candidate set as pieces of identification information of the transmitters provided on the current four traveling wheels.

2. The wheel registration apparatus according to claim 1, wherein:
upon reception of the identification information included in the wheel set registered in the past, the second controller takes the wheel set registered in the past including the identification information as the candidate set.

3. The wheel registration apparatus according to claim 1, wherein:
when the registration mode is entered,
the second controller
performs a reception of the frame during a predetermined set time,
selects the wheel set registered in the past including the identification information as a target set upon reception of the frame including the identification information included in the wheel set registered in the past during the set time,
brings the vehicle in a traveling state and further performs the reception of the frame in a case where a plurality of the target sets is provided, and
determines the target set including the identification information as the candidate set upon reception of the frame including the identification information in the traveling state.

4. The wheel registration apparatus according to claim 1, wherein:
when the registration mode is entered,
the second controller
performs a reception of the frame during a predetermined set time,
selects the wheel set registered in the past including the identification information as a target set upon reception of the frame including the identification information included in the wheel set registered in the past during the set time,
determines no candidate set during the set time in a case where a plurality of the target sets is provided, and
determines the wheel set received all the frames including four pieces of the identification information as the candidate set after a lapse of the set time, or causes the candidate set to remain undetermined even the wheel set received all the frames including four pieces of the identification information after the lapse of the set time is provided, when the frame including the identification information of another target set is received.

5. The wheel registration apparatus according to claim 3, applied to a vehicle in which a spare wheel is provided on the vehicle body in addition to the four traveling wheels, wherein:
the transmitter that creates and transmits a frame including unique identification information is also provided on the spare wheel;
the second controller
registers the identification information included in the frame transmitted from the transmitter provided on the spare wheel as the wheel set, in addition to the four pieces of the identification information included in the frames transmitted from the transmitters provided on the four traveling wheels,
removes the frame including the identification information included in the frame transmitted from the transmitter provided on the spare wheel from the pieces of the identification information included in the wheel set registered in the past at a time of selecting the target set, and
determines the target set including the identification information as the candidate set upon reception of the pieces of the identification information included in the frames transmitted from the transmitters provided on the four traveling wheels.

6. The wheel registration apparatus according to claim 5, wherein:
the second controller
switches to one of a case where four pieces of the identification information included in the frames transmitted from the transmitters provided on the four traveling wheels are registered as the wheel set and a case where five pieces of the identification information by adding the identification information included in the frame transmitted from the transmitter provided on the spare wheel are registered, and
determines the candidate set from the wheel sets having an identical registration number as a registration number of the pieces of registered identification information of the current transmitter in the registration mode.

7. The wheel registration apparatus according to claim 1, wherein:
when the registration mode is entered,
the second controller
determines whether the frame including the identification information included in the pre-replacement set is received, and
determines the candidate set from the wheel set registered in the past and different from the pre-replacement set, in response to that no frame including the identification information included in the pre-replacement set is received.

8. The wheel registration apparatus according to claim 7, wherein:
upon reception of the frame including the identification information included in the pre-replacement set in the registration mode,
the second controller
determines whether tire states of the four traveling wheels provided with four of the transmitters that transmit the frames are normal on a basis of the frames including four pieces of the identification information included in the pre-replacement set, and
determines the candidate set from the wheel set registered in the past and different from the pre-replacement set, in response to that a result of the determination is normal.

9. The wheel registration apparatus according to claim 8, wherein:
the second controller determines whether a state of the transmitter is normal as the determination of whether the tire state is normal.

10. The wheel registration apparatus according to claim 8, wherein:
the transmitter provided on each of the four traveling wheels detects tire pressure of each of the four traveling wheels, stores and transmits a result of the detection of the tire pressure into the frame; and
the second controller determines, as the determination of whether the tire state is normal, whether the tire pressure of each of the four traveling wheels exceeds a threshold or is equal to or less than the threshold.

11. The wheel registration apparatus according to claim 1, wherein:
the second controller
has a non-transitional tangible storage medium including a main registration frame and a past frame,
is configured to register the identification information of each of the plurality of wheel sets into the non-transitional tangible storage medium,
sets the wheel sets, in which the identification information is registered, to a predetermined number of sets, registers the identification information of current wheel set currently attached to the vehicle in the main registration frame,
registers a plurality of past wheel sets registered in the past in the past frame, and
deletes the identification information of oldest wheel set registered in the past frame when the predetermined number of sets is exceeded.

12. The wheel registration apparatus according to claim 11, wherein:
the identification information is registered in order from a first frame of the past frame, starting from newest wheel set of the past wheel sets.

13. The wheel registration apparatus according to claim 12, wherein:
in the registration mode,
the second controller
determines the candidate set among the wheel sets registered in the past frame, and
upon reception of all the frames including the identification information included in the candidate set, moves the identification information included in the candidate set to the main registration frame, and moves the current wheel set registered in the main registration frame to the first frame of the past frame.

14. The wheel registration apparatus according to claim 11, wherein:
in the registration mode,
a comparison is made between the identification information included in the frame transmitted by the transmitter of the traveling wheel, and the identification information of the current wheel set stored in the main registration frame and the identification information of the past wheel set registered in the past frame,
in response to that all pieces of the identification information compared are different, the identification information included in the frame transmitted by the transmitter of the traveling wheel is registered in the main registration frame as identification information of a new wheel set, and
in response to that one to three pieces of the identification information are common and remainder of the identification information is different, the identification information included in the frame transmitted by the transmitter of the traveling wheel is registered in the main registration frame as identification information of a new wheel set, and the registration of the wheel set including the common identification information is deleted.

15. A tire pressure monitoring system comprising:
the wheel registration apparatus according to claim 1, wherein:
the transmitter includes a sensing portion that outputs a detection signal corresponding to air pressure of the tire provided in each of the four traveling wheels;
the transmitter stores, into the frame, information on tire pressure obtained by the first controller performing signal processing on the detection signal of the sensing portion, and transmits the frame to the receiver; and
the receiver detects the air pressure of the tire provided in each of the plurality of wheels from the information on the tire pressure by the second controller.

16. A wheel registration apparatus applied to a vehicle in which four vehicle wheels provided with tires are attached to a vehicle body, the wheel registration apparatus comprising:
a transmitter that is provided on each of the vehicle wheels, the transmitter having a first controller configured to create and transmit a frame including identification information unique to the corresponding transmitter; and
a receiver that is provided on the vehicle body, wirelessly receives the frames transmitted by the transmitters in a registration mode, and has a second controller configured to register four pieces of the identification information in the respective frames as pieces of identification information of the transmitters currently provided on the vehicle wheels,
wherein:
the second controller in the registration mode registers the four pieces of the identification information included in the transmitted frames as one wheel set for tire replacement, and registers a plurality of the wheel sets;
in response to that the registration mode is entered again after the plurality of the wheel sets are registered, the second controller takes as a pre-replacement set, the wheel set registered when the registration mode is entered and selects a candidate set from a wheel set different from the pre-replacement set among the wheel sets; and
upon reception of the frames including the four pieces of the identification information included in the candidate set, the second controller registers the four pieces of the identification information included in the candidate set as pieces of identification information of the transmitters currently provided on the vehicle wheels.

* * * * *